US012812624B2

(12) United States Patent
Oh et al.

(10) Patent No.: US 12,812,624 B2
(45) Date of Patent: Nov. 24, 2026

(54) METHOD AND APPARATUS FOR CHANGING UPLINK-DOWNLINK CONFIGURATION IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Younsun Kim, Suwon-si (KR); Hoondong Noh, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 18/012,060

(22) PCT Filed: Jun. 23, 2021

(86) PCT No.: PCT/KR2021/007903
§ 371 (c)(1),
(2) Date: Dec. 21, 2022

(87) PCT Pub. No.: WO2022/014892
PCT Pub. Date: Jan. 20, 2022

(65) Prior Publication Data

US 2023/0292304 A1 Sep. 14, 2023

(30) Foreign Application Priority Data

Jul. 14, 2020 (KR) ........................ 10-2020-0086910

(51) Int. Cl.
*H04W 72/12* (2023.01)
*H04W 72/23* (2023.01)
*H04W 72/50* (2023.01)

(52) U.S. Cl.
CPC ........... *H04W 72/12* (2013.01); *H04W 72/23* (2023.01); *H04W 72/535* (2023.01)

(58) Field of Classification Search
CPC .... H04W 72/12; H04W 72/535; H04W 72/23
See application file for complete search history.

(56) References Cited

U.S. PATENT DOCUMENTS

2013/0044652 A1 2/2013 Wang et al.
2013/0188516 A1 7/2013 He et al.
(Continued)

FOREIGN PATENT DOCUMENTS

CN 103548409 A 1/2014
CN 110892775 A 3/2020
(Continued)

OTHER PUBLICATIONS

R1-104071; 3GPP TSG-RAN WG1 Meeting #61bis; Further Discussion on Fast Primary Carrier Change in 4C-HSDPA, Jun. 24, 2010.

(Continued)

*Primary Examiner* — Joseph E Avellino
*Assistant Examiner* — Maryam Emadi
(74) *Attorney, Agent, or Firm* — Jefferson IP Law, LLP

(57) ABSTRACT

Disclosed are a method and apparatus for changing uplink-downlink configuration in a wireless communication system. The method may comprise the steps of transmitting, to user equipment, uplink-downlink configuration information indicating first uplink-downlink configuration, transmitting, to the user equipment, a change indicator indicating second uplink-downlink configuration, determining whether or not an uplink-downlink direction is changed within a specific frequency domain resource based on a change from the first uplink-downlink configuration to the second uplink-downlink configuration, and, based on the uplink-downlink direc- (Continued)

tion being changed, communicating with the user equipment on the frequency domain resource, according to the second uplink-downlink configuration after a predetermined change delay time from transmission of the change indicator.

16 Claims, 17 Drawing Sheets

(56) References Cited

U.S. PATENT DOCUMENTS

| | | | | |
|---|---|---|---|---|
| 2013/0272169 A1 | | 10/2013 | Wang et al. | |
| 2014/0050130 A1 | | 2/2014 | Kim et al. | |
| 2015/0195056 A1 | * | 7/2015 | He | H04W 72/20<br>370/280 |
| 2015/0373675 A1 | | 12/2015 | Seo et al. | |
| 2016/0165578 A1 | | 6/2016 | Chen et al. | |
| 2016/0174245 A1 | | 6/2016 | Guo et al. | |
| 2016/0255608 A1 | | 9/2016 | Park | |
| 2016/0278089 A1 | | 9/2016 | Lee et al. | |
| 2016/0338089 A1 | | 11/2016 | Vos | |
| 2017/0223671 A1 | | 8/2017 | He et al. | |
| 2017/0302419 A1 | * | 10/2017 | Liu | H04W 72/23 |
| 2019/0069197 A1 | | 2/2019 | Takeda et al. | |
| 2019/0182832 A1 | | 6/2019 | Oizumi et al. | |
| 2020/0015206 A1 | | 1/2020 | Lee | |
| 2020/0146038 A1 | * | 5/2020 | Zhang | H04W 72/23 |
| 2020/0221449 A1 | | 7/2020 | Bang et al. | |
| 2020/0322842 A1 | * | 10/2020 | Takeda | H04W 72/20 |

FOREIGN PATENT DOCUMENTS

| | | | | | |
|---|---|---|---|---|---|
| KR | 10-2014-0054269 A | | 5/2014 | | |
| KR | 10-2015-0105328 A | | 9/2015 | | |
| KR | 10-2016-0038001 A | | 4/2016 | | |
| KR | 10-2021-0043304 A | | 4/2021 | | |
| WO | 2015/020492 A1 | | 2/2015 | | |
| WO | 2015-069054 A1 | | 5/2015 | | |
| WO | WO-2018059202 A1 | * | 4/2018 | H04W 72/23 | |
| WO | 2019-035701 A1 | | 2/2019 | | |
| WO | WO-2019214380 A1 | * | 11/2019 | H04W 56/0045 | |

OTHER PUBLICATIONS

R1-112525; 3GPP TSG RAN WG1 #66; Preliminary evaluation of TDD UL-DL reconfiguration performance, Aug. 16, 2011.

R2-086457; 3GPP TSG-RAN WG2 Meeting #64; Introduction of HS-DSCH cell change enhancements, Nov. 4, 2008.

Chinese Office Action dated Apr. 1, 2025, issued in a Chinese Patent Application No. 202180060678.7.

Korean Office Action dated Jun. 23, 2025, issued in Korean Application No. 10-2020-0086910.

Qualcomm Incorporated, Remaining issues on GC-PDCCH carrying SFI, R1-1804799, 3GPP TSG RAN WG1 #92bis, Apr. 16, 2028.

LG Electronics et al, WF on SFI pattern and contents, R1-1716923, 3GPP TSG RAN1 NR Ad Hoc #3, Sep. 18, 2017.

Vivo, Remaining issues on SFI, R1-1806057, 3GPP TSG RAN WG1 Meeting #93, May 21, 2018.

Huawei et al, Discussion on dynamic TDD UL-DL configuration in NR UE demodulation performance requirements, R4-1816003, 3GPP TSG-RAN WG4 Meeting #89, Nov. 12, 2018.

Korean Notice of Allowance dated Nov. 21, 2025, issued in Korean Patent Application No. 10-2020-0086910.

Chinese Office Action dated Aug. 14, 2025, issued in Chinese Patent Application No. 202180060678.7.

* cited by examiner

METHOD AND APPARATUS FOR CHANGING UPLINK-DOWNLINK CONFIGURATION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2021/007903, filed on Jun. 23, 2021, which is based on and claims priority of a Korean patent application number 10-2020-0086910, filed on Jul. 14, 2020, in the Korean Intellectual Property Office, the disclosure of which is incorporated by reference herein in its entirety.

BACKGROUND

1. Field

The disclosure relates to a method and device for changing an uplink-downlink configuration in a wireless communication system.

2. Description of Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (COMP), and reception interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 3eG technology and the IoT technology.

As described above, as wireless communication systems evolve to provide various services, a need arises for a method for smoothly providing such services. In particular, techniques for flexibly allocating uplink resources and downlink resources in the time domain and frequency domain are required for additional coverage extension.

SUMMARY

Embodiments of the disclosure provide a method and device for changing an uplink-downlink configuration in a wireless communication system.

The disclosure provides a method and device for applying a changed uplink-downlink configuration when changing an uplink-downlink configuration.

The disclosure provides a method and device for applying a latency before starting a transmission/reception operation according to a changed uplink-downlink configuration.

The disclosure provides a method and device for applying a changed uplink-downlink configuration when a change occurs between uplink and downlink in a specific frequency resource due to a change in uplink-downlink configuration.

The disclosure provides a method and device for applying a changed uplink-downlink configuration after a latency according to a predetermined condition when changing an uplink-downlink configuration.

According to an embodiment of the disclosure, a method by a base station configured to change an uplink-downlink configuration in a wireless communication system may comprise transmitting uplink-downlink configuration information indicating a first uplink-downlink configuration to a UE, transmitting a change indicator indicating a second uplink-downlink configuration to the UE, determining whether an uplink-downlink direction is changed in a specific frequency domain resource based on a change from the first uplink-downlink configuration to the second uplink-downlink configuration, and based on the uplink-downlink direction being changed, communicating with the UE on the frequency domain resource according to the second uplink-downlink configuration after a change delay time predetermined from transmission of the change indicator.

According to an embodiment of the disclosure, a method by a UE configured to change an uplink-downlink configuration in a wireless communication system may comprise receiving uplink-downlink configuration information indicating a first uplink-downlink configuration from a base station, receiving a change indicator indicating a second uplink-downlink configuration from the base station, determining whether an uplink-downlink direction is changed in a specific frequency domain resource based on a change from the first uplink-downlink configuration to the second uplink-downlink configuration, and based on the uplink-downlink direction being changed, communicating with the base station on the frequency domain resource according to the second uplink-downlink configuration after a change delay time predetermined from transmission of the change indicator.

According to an embodiment of the disclosure, a device of a base station configured to change an uplink-downlink configuration in a wireless communication system may comprise a transceiver configured to transmit uplink-downlink configuration information indicating a first uplink-downlink configuration to a UE and transmit a change indicator indicating a second uplink-downlink configuration to the UE and a processor configured to determine whether an uplink-downlink direction is changed in a specific frequency domain resource based on a change from the first uplink-downlink configuration to the second uplink-downlink configuration and, based on the uplink-downlink direction being changed, control the transceiver to communicate with the UE according to the second uplink-downlink configuration after a change delay time predetermined from transmission of the change indicator.

According to an embodiment of the disclosure, a device of a UE configured to change an uplink-downlink configuration in a wireless communication system may comprise a transceiver configured to receive uplink-downlink configuration information indicating a first uplink-downlink configuration from a base station and transmit a change indicator indicating a second uplink-downlink configuration to the base station and a processor configured to determine whether an uplink-downlink direction is changed in a specific frequency domain resource based on a change from the first uplink-downlink configuration to the second uplink-downlink configuration and, based on the uplink-downlink direction being changed, control the transceiver to communicate with the base station according to the second uplink-downlink configuration after a change delay time predetermined from transmission of the change indicator.

According to the disclosed embodiments, it is possible to effective changing an uplink-downlink configuration in a wireless communication system.

DETAILED DESCRIPTION

Figure 1:
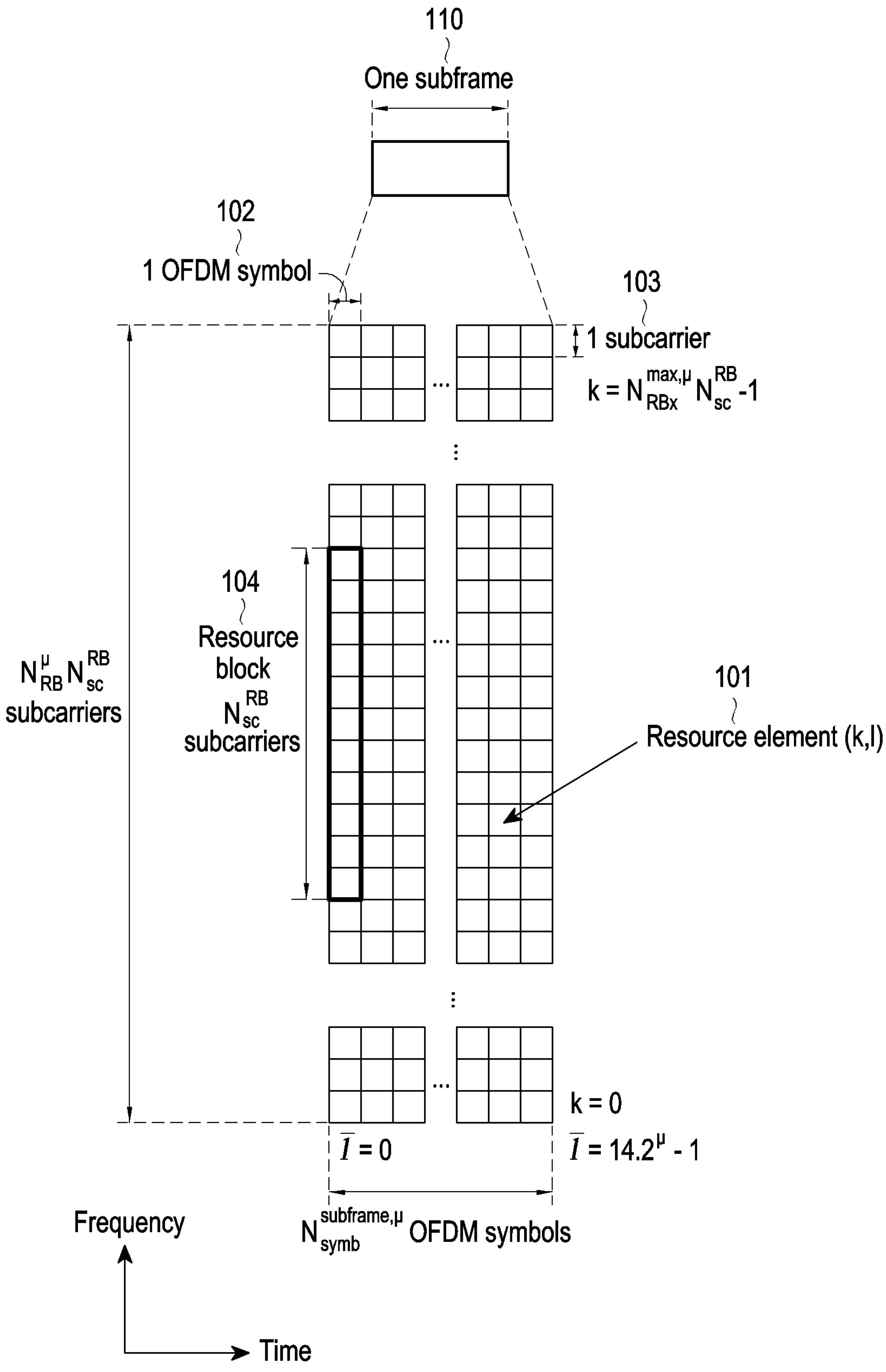
FIG. 1 is a view illustrating a basic structure of a time-frequency domain in a wireless communication system.

Hereinafter, embodiments of the present invention are described in detail with reference to the accompanying drawings.

In describing the embodiments, the description of technologies that are known in the art and are not directly related to the disclosure is omitted. This is for further clarifying the gist of the present disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be understood through the embodiments to be described below taken in conjunction with the accompanying drawings. However, the scope of the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, the base station (BS) may be an entity allocating resource to a user equipment (UE) and may be at least one of gNode B, eNode B, Node B, radio access unit, base station controller, or node over network. The user equipment (UE) may include a mobile station (MS), cellular phone, smartphone, computer, or multimedia system capable of performing communication functions. In the disclosure, downlink (DL) refers to a wireless transmission path of signal transmitted from the base station to the UE, and uplink (UL) refers to a wireless transmission path of signal transmitted from the UE to the base station. Although LTE, LTE-A, or 5G systems may be described below as an example, the embodiments may be applied to other communication systems having a similar technical background or channel pattern. For example, 5G mobile communication technology (or new radio, NR) developed after LTE-A may be included therein, and 5G below may be a concept including legacy LTE, LTE-A and other similar services. Further, the embodiments may be modified in such a range as not to significantly depart from the scope of the present invention under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. Further, in the disclosure, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), or institute of electrical and electronics engineers (IEEE) 802.16e communication standards.

As a representative example of such broadband wireless communication system, LTE system adopts orthogonal frequency division multiplexing (OFDM) for downlink and single carrier frequency division multiple access (SC-FDMA) for uplink. Uplink means a wireless link where the UE transmits data or control signals to the base station (BS), and download means a wireless link where the base station transmits data or control signals to the UE. Such multiple access scheme may typically allocate and operate time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that simultaneously meet various requirements. Services considered for 5G communication systems include, e.g., enhanced mobile broadband (eMBB), massive machine type communication (MMTC), and ultra-reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT devices are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life, e.g., 10 years to 15 years.

URLLC is a mission-critical, cellular-based wireless communication service. For example, there may be considered a service for use in at least one of remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of 75 or less. Thus, for URLLC-supportive services, the 5G communication system may be required to provide a shorter transmit time interval (TTI) than those for other services while securing reliable communication links by allocating a broad resource in the frequency band.

The three 5G services, i.e., eMBB, URLLC, and mMTC, may be multiplexed in one system and be transmitted. In this case, the services may adopt different TX/RX schemes and TX/RX parameters to meet their different requirements. Of course, 5G is not limited to the above-described three services.

The frame structure of the 5G system is described below in more detail with reference to the drawings.

FIG. 1 is a view illustrating a basic structure of a radio resource area where data or a control channel is transmitted in a 5G wireless communication system.

Referring to FIG. 1, the horizontal axis represents one subframe 110 in the time domain, and the vertical axis represents one frequency band in the frequency domain. A basic unit of a resource in the time and frequency domain is a resource element (RE) 101, which may be defined by one orthogonal frequency division multiplexing (OFDM) symbol 102 in the time domain, and by one subcarrier 103 in the frequency domain. In the frequency domain, $$N_{sc}^{RB}$$

(e.g., 12) consecutive REs may constitute one resource block (RB) 104.

Figure 2:
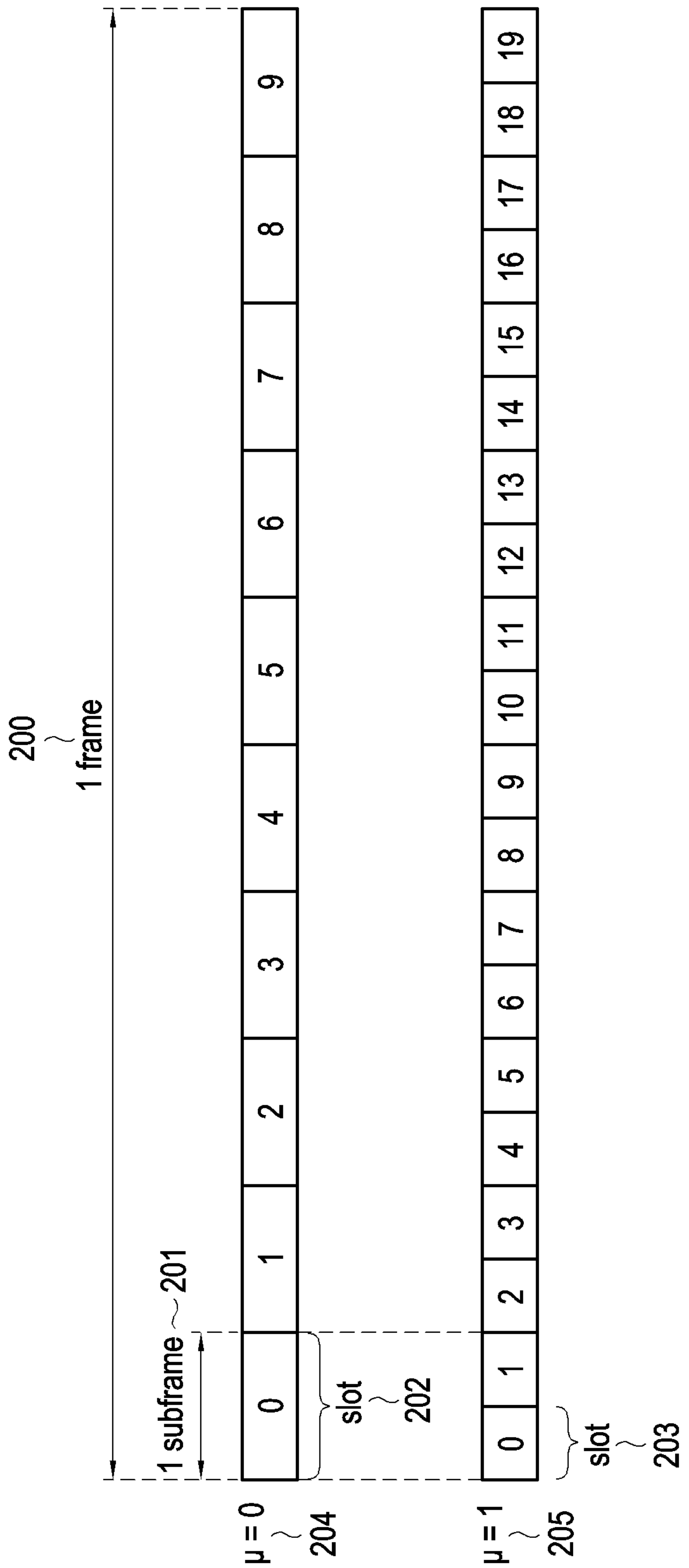
FIG. 2 is a view illustrating an example of a slot structure used in a wireless communication system.

FIG. 2 is a view illustrating an example of a slot structure used in a 5G wireless communication system.

FIG. 2 illustrates an example structure including a frame 200, a subframe 201, and a slot 202 or 203. One frame 200 may be defined as 10 ms. One subframe 201 may be defined as 1 ms, and thus, one frame 200 may consist of a total of 10 subframes 201. One slot 202 or 203 may be defined as 14 OFDM symbols (that is, the number $$(N_{symb}^{slot})$$

of symbols per slot=14). One subframe 201 may be composed of one or more slots 202 or 203, and the number of slots 202 or 203 per subframe 201 is determined depending on μ 204 or 205, which is a setting value for the subcarrier spacing (SCS). In the illustrated example, the subcarrier spacing setting value μ=0 (204) and the subcarrier spacing setting value μ=1 (205). When μ=0 (204), one subframe 201 may consist of one slot 202, and when μ=1 (205), one subframe 201 may consist of two slots (203). In other words, according to the set subcarrier spacing value μ, the number $$(N_{slot}^{subframe,\mu})$$

of slots per subframe may vary, and accordingly, the number $$(N_{slot}^{frame,\mu})$$

of slots per frame may differ. According to each subcarrier spacing μ, $$N_{slot}^{subframe,\mu}$$

and $$N_{slot}^{frame,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

<BWP>

A configuration of a bandwidth part (BWP) in a 5G wireless communication system is described below with reference to the drawings.

Figure 3:
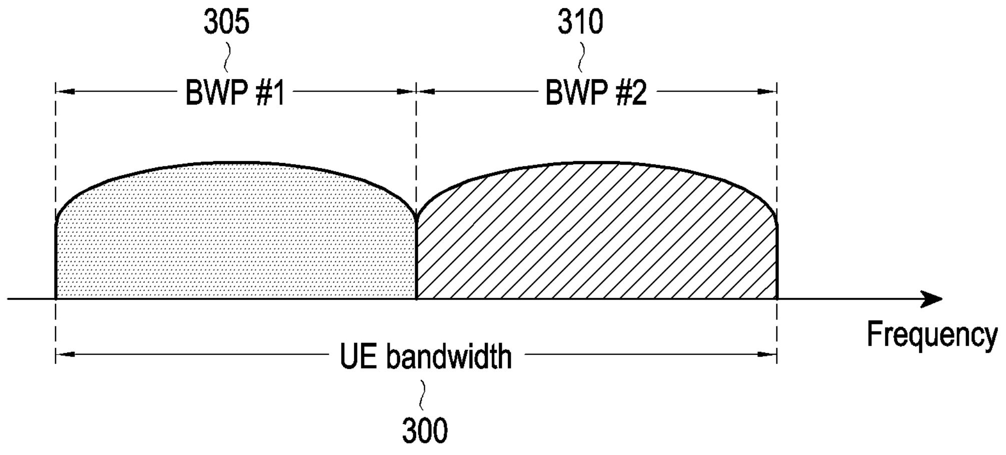
FIG. 3 is a view illustrating an example of a configuration for a bandwidth part (BWP) in a wireless communication system.

FIG. 3 is a view illustrating an example of a configuration for a bandwidth part (BWP) in a 5G wireless communication system.

FIG. 3 illustrates an example in which a UE bandwidth 300 is divided into two bandwidth parts, e.g., bandwidth part #1 (BWP #1) 305 and bandwidth part #2 (BWP #2) 310. The base station may configure one or more bandwidth parts in the UE and, for each bandwidth part, information below may be configured.

Table 2

```
BWP ::=                  SEQUENCE {
  bwp-Id                 BWP-Id,
  locationAndBandwidth   INTEGER (1 . . . 65536) ,
  subcarrierSpacing      ENUMERATED {n0, n1, n2, n3, n4, n5},
  cyclicPrefix           ENUMERATED { extended }
}
```

Here, bwp-Id means the bandwidth part identifier, locationAndBandwidth indicates the location of the bandwidth part, subcarrierSpacing indicates the subcarrier spacing, and cyclicPrefix indicates the length of the cyclic prefix (CP).

The configuration of the bandwidth part is not limited thereto, other various BWP-related parameters than the above-described configuration information may be configured in the UE. The base station may transmit the configuration information to the UE through higher layer signaling, e.g., radio resource control (RRC) signaling. At least one bandwidth part among one or more configured bandwidth parts may be activated. Whether to activate the configured bandwidth part may be transmitted from the base station to the UE semi-statically through RRC signaling or dynamically through downlink control information (DCI).

Before radio resource control (RRC) connected, the UE may be configured with an initial bandwidth part (BWP) for initial access by the base station via a master information block (MIB). The UE may receive configuration information about the search space and control resource set (CORESET) in which the physical downlink control channel (PDCCH) may be transmitted through the MIB in the initial access phase. Each of the control resource set and search space configured with the MIB may be regarded as identity (ID) 0. The base station may provide the UE with at least one or more pieces of information among the frequency allocation information, time allocation information, and numerology for control resource set #0 through the MIB. Here, the numerology may include at least one of the subcarrier spacing or cyclic prefix (CP). Here, CP may mean at least one of the length of the CP or information corresponding to the CP length (e.g., normal CP length or extended CP length). Further, the base station may provide the UE with configuration information for occasion and monitoring period for control resource set #0, i.e., configuration information for search space #0, via the MIB. The UE may regard the frequency range set as control resource set #0 obtained from the MIB, as the initial BWP for initial access. In this case, the identity (ID) of the initial BWP may be regarded as 0.

The configuration of the bandwidth part supported by the 5G wireless communication system described above may be used for various purposes.

When the bandwidth supported by the UE is smaller than the system bandwidth, the configuration for the bandwidth part may be used. For example, the base station may configure the frequency domain position of the bandwidth part in the UE (e.g., by the configuration information of the higher layer) to allow the UE to transmit/receive data in a specific frequency position in the system bandwidth.

For the purpose of supporting different numerologies, the base station may configure the UE with a plurality of bandwidth parts. For example, to support data transmission/reception using a subcarrier spacing of 15 kHz and a subcarrier spacing of 30 kHz for some UE, the base station may configure the UE with two bandwidths, as subcarrier spacings of 15 kHz and 30 kHz. The different bandwidth parts may be frequency division multiplexed and, when the base station transmits/receives data at a specific subcarrier spacing, the bandwidth part set as the specific subcarrier spacing may be activated.

For the purpose of reducing power consumption of the UE, the base station may configure the UE with bandwidth parts having different sizes of bandwidths. For example, although the UE may support a very large bandwidth, e.g., a bandwidth of 100 MHz, transmission/reception of data always using the entire bandwidth may cause significantly large power consumption. In particular, it is very inefficient in terms of power consumption to monitor an unnecessary downlink control channel using a large bandwidth of 100 MHz in a situation where there is no traffic. For the purpose of reducing power consumption of the UE, the base station may configure a bandwidth part of a relatively small bandwidth to the UE, e.g., a bandwidth part of 20 Mhz, in the UE. In a no-traffic situation, the UE may perform monitoring in the 20 MHz bandwidth and, if data occurs, the UE may transmit/receive data in the 100 MHz bandwidth according to an instruction from the base station.

As described above, UEs before RRC connected may receive configuration information for the initial bandwidth part via MIB in the initial access phase. The UE may be configured with a control resource set (CORESET) for a downlink control channel (PDCCH) from the MIB of a physical broadcast channel (PBCH). The bandwidth of the control resource set configured through the MIB may be regarded as the initial bandwidth part, and the UE may receive the physical downlink shared channel (PDSCH), which transmits the SIB, via the configured initial bandwidth part. The UE may detect the PDCCH on the search space and the control resource set in the initial bandwidth part configured with the MIB, receive remaining system information (RMSI) or system information block (SIB) 1 necessary for initial access through the PDSCH scheduled by the PDCCH, and obtain configuration information regarding the uplink initial bandwidth part through the SIB1 (or RMSI). The initial BWP may be utilized for other system information (OSI), paging, and random access as well as for receiving SIB.

If the UE is configured with one or more BWPs, the base station may indicate, to the UE, a change in BWP using the BWP indicator in the DCI. As an example, when the currently activated bandwidth part of the UE is bandwidth part #1 305 in FIG. 3, the base station may indicate, to the UE, bandwidth part #2 310 with the bandwidth part indicator in the DCI, and the UE may change the bandwidth part to bandwidth part #2 310, indicated using the bandwidth part indicator in the DCI.

As described above, the DCI-based bandwidth part change may be indicated by the DCI scheduling PDSCH or physical uplink shared channel (PUSCH). When the UE receives a request for changing the bandwidth part in the DCI, the UE should be able to receive or transmit the PDSCH or PUSCH scheduled by the DCI without any trouble in the changed bandwidth part. To that end, the standard specified requirements for delay time TBWP required upon changing bandwidth part, which may be defined as shown in Table 3 below.

TABLE 3

| μ | NR Slot length (ms) | BWP switch delay $T_{BWP}$ (slots) Type 1[Note 1] | Type 2[Note 1] |
|---|---|---|---|
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirement for delay of bandwidth part change may support type 1 or type 2 according to the capability of the UE. The UE may report a supportable bandwidth part delay time type to the base station.

If the UE receives, in slot n, DCI including a bandwidth part change indicator according to the above-described requirements for bandwidth part change delay time, the UE may complete a change to the new bandwidth part, indicated by the bandwidth part change indicator, at a time not later than slot n+$T_{BWP}$, and may perform transmission/reception on the data channel scheduled by the DCI in the changed, new bandwidth part. Upon scheduling data channel in the new bandwidth part, the base station may determine time domain resource allocation for data channel considering the UE's bandwidth part change delay time $T_{BWP}$. In other words, when scheduling a data channel with the new bandwidth part, in a method for determining a time domain resource allocation for the data channel, the base station may schedule a corresponding data channel after the bandwidth part change delay time. Thus, the UE may not expect that the DCI indicating the bandwidth part change indicates a slot offset (K0 or K2) smaller than the bandwidth part change delay time $T_{BWP}$.

If the UE has received the DCI (e.g., DCI format 1_1 or 0_1) indicating the bandwidth part change, the UE may perform no transmission or reception during the time period from the third symbol of the slot in which the PDCCH including the DCI has been received to the start symbol of the slot indicated by the slot offset (K0 or K2) value indicated by the time domain resource allocation field in the DCI. For example, if the UE receives the DCI indicating a bandwidth part change in slot n, and the slot offset value indicated by the DCI is K, the UE may perform no transmission or reception from the third symbol of slot n to a symbol before a previous symbol of slot n+K (i.e., the last symbol of slot n+K−1).

<SS/PBCH>

Next, the synchronization signal (SS)/PBCH block in the 5G wireless communication system is described.

The SS/PBCH block may mean a physical layer channel block composed of primary SS (PSS), secondary SS (SSS), and PBCH described below.

PSS: A signal that serves as a reference for downlink time/frequency synchronization and provides part of the information for cell ID.

SSS: serves as a reference for downlink time/frequency synchronization, and provides the rest of the information for cell ID, which PSS does not provide. Additionally, it may serve as a reference signal (RS) for demodulation of PBCH.

PBCH: provides essential system information necessary for the UE to transmit and receive data channel and control channel. The essential system information may include at least one of search space-related control information indicating radio resource mapping information for a control channel or scheduling control information for a separate data channel for transmitting system information.

SS/PBCH block: The SS/PBCH block is composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and may be therefrom configured with control resource set (CORESET) #0 (which may correspond to a control resource set having a control resource set index of 0). The UE may perform monitoring on control resource set #0, assuming that the selected SS/PBCH block and the demodulation reference signal (DMRS) transmitted in control resource set #0 are quasi-co-located (QCLed). The UE may receive system information using the downlink control information transmitted in control resource set #0. The UE may obtain configuration information related to random access channel (RACH) required for initial access from the received system information. The UE may transmit the physical RACH (PRACH) to the base station considering the selected SS/PBCH index, and the base station receiving the PRACH may obtain the SS/PBCH block index selected by the UE. The base station may know which block the UE has selected from the SS/PBCH blocks and monitors control resource set #0 related thereto.

<DCI>

Next, downlink control information (DCI) in the 5G wireless communication system is described.

In the 5G system, scheduling information for uplink data (or PUSCH) or downlink data (or PDSCH) may be transmitted from the base station to the UE through the DCI. The UE may attempt to monitor or detect at least one of the DCI format for fallback and the DCI format for non-fallback for the PUSCH or PDSCH. The fallback DCI format may be composed of fields predetermined between the base station and the UE, and the non-fallback DCI format may include configurable fields.

DCI may be transmitted through the physical downlink control channel (PDCCH), via channel coding and modulation. A cyclic redundancy check (CRC) is added to the payload of the DCI, and the CRC is scrambled with the radio network temporary identifier (RNTI) that is the identity of the UE. Different RNTIs may be used depending on the purposes of the DCI, e.g., at least one of UE-specific data transmission, power control command, or random access response. In other words, the RNTI is not explicitly transmitted, but the RNTI is included in the CRC calculation process and transmitted. Upon receiving the DCI transmitted on the PDCCH, the UE may check the CRC using the allocated RNTI, and when the result of the CRC check is successful, the UE may be aware that the DCI has been transmitted to the UE.

For example, DCI scheduling a PDSCH for system information (SI) may be scrambled to SI-RNTI. DCI scheduling a PDSCH for a random access response (RAR) message may be scrambled to RA-RNTI. DCI scheduling a PDSCH for a paging message may be scrambled with P-RNTI. DCI providing a slot format indicator (SFI) may be scrambled to SFI-RNTI. DCI providing transmit power control (TPC)

may be scrambled to TPC-RNTI. DCI scheduling UE-specific PDSCH or PUSCH may be scrambled with any one of the cell RNTI (C-RNTI), modulation coding scheme C-RNTI (MCS-C-RNTI), or configured scheduling RNTI (CS-RNTI).

DCI format 0_0 may be used as fallback DCI for scheduling PUSCH, and in this case, CRC may be scrambled to C-RNTI. DCI format 0_0 in which CRC is scrambled to C-RNTI may include, e.g., the fields as shown in Table 4 below.

TABLE 4

| |
|---|
| Identifier for DCI formats - 1 bit<br>The value of this bit field is always set to 0, indicating an UL DCI format |
| Frequency domain resource assignment - $\lceil \log_2(N_{RB}^{UL,BWP}(N_{RB}^{UL,BWP}+1)/2\rceil$ bits where |
| $N_{RB}^{UL,BWP}$ is defined in subclause 7.3.1.0 |
| For PUSCH hopping with resource allocation type 1:<br>$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values |
| $\lceil \log_2(N_{RB}^{UL,BWP}(N_{RB}^{UL,BWP}+1)/2\rceil - N_{UL-hop}$ bits provides the frequency domain resource allocation |
| according to Subclause 6.1.2.2.2 of [6, TS 38.214]<br>For non-PUSCH hopping with resource allocation type 1: |
| $\lceil \log_2(N_{RB}^{UL,BWP}(N_{RB}^{UL,BWP}+1)/2\rceil$ bits provides the frequency domain resource allocation |
| according to Subclause 6.1.2.2.2 of [6, TS 38.214]<br>Time domain resource assignment- 4 bits as defined in Subclause 6.1.2.1 of [6, TS 38.214]<br>Frequency hopping flag- 1 bit according to Table 7.3.1.1.1-3, as defined in Subclause 6.3 of [6, TS 38.214]<br>Modulation and coding scheme - 5 bits as defined in Subclause 6.1.4.1 of [6, TS 38.214]<br>New data indicator - 1 bit<br>Redundancy version - 2 bits as defined in Table 7.3.1.1.1-2<br>HARQ process number - 4 bits<br>TPC command for scheduled PUSCH - 2 bits as defined in Subclause 7.1.1 of [5, TS 38.213]<br>Padding bits, if required.<br>UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).<br>If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;<br>If the UL/SUL indicator is not present in DCI format 0_0 and pucch-Config is configured, the corresponding PUSCH scheduled by the DCI format 0_0 is for the UL or SUL for which high layer parameter pucch-Config is configured.<br>If the UL/SUL indicator is not present in DCI format 0_0 and pucch-Config is not configured, the corresponding PUSCH scheduled by the DCI format 0_0 is for the uplink on which the latest PRACH is transmitted. |

DCI format 0_1 may be used as non-fallback DCI for scheduling PUSCH, and in this case, CRC may be scrambled to C-RNTI. DCI format 0_1 in which CRC is scrambled to C-RNTI may include, e.g., the information shown in Table 5 below.

TABLE 5

| |
|---|
| Identifier for DCI formats - 1 bit<br>The value of this bit field is always set to 0, indicating an UL DCI format<br>Carrier indicator - 0 or 3 bits, as defined in Subclause 10.1 of [5, TS38.213].<br>UL/SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.<br>Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP})\rceil$ bits, where<br>$n_{BWP} = n_{BWP,RRC} + 1$ if $n_{BWP,RRC} \leq 3$, in which case the bandwidth part indicator is equivalent to the ascending order of the higher layer parameter BWP-Id; |

TABLE 5-continued otherwise $n_{BWP} = n_{BWP,RRC}$ in which case the bandwidth part indicator is defined in Table 7.3.1.1.2-1;

If a UE does not support active BWP change via DCI, the UE ignores this bit field.

Frequency domain resource assignment - number of bits determined by the following, where $N_{RB}^{UL,BWP}$ is the size of the active UL bandwidth part:

$N_{RBG}$ bits if only resource allocation type 0 is configured, where $N_{RBG}$ is defined in Subclause 6.1.2.2.1 of [6, TS 38.214], $\lceil \log_2(N_{RB}^{UL,BWP}(N_{RB}^{UL,BWP}+1)/2\rceil$ bits if only resource allocation type 1 is configured, or $\max(\lceil \log_2(N_{RB}^{UL,BWP}(N_{RB}^{UL,BWP}+1)/2\rceil, N_{RBG})+1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 6.1.2.2.1 of [6, TS 38.214].

For resource type 1, the $\lceil \log_2(N_{RB}^{UL,BWP}(N_{RB}^{UL,BWP}+1)/2\rceil$ LSBs provide the resource allocation as follows:

For PUSCH hopping with resource allocation type 1:

$N_{UL\_hop}$ MSB bits are used to indicate the frequency offset according to Subclause 6.3 of [6, TS 38.214], where NUL hop =1 if the higher layer parameter frequencyHoppingOffsetLists contains two offset values and $N_{UL\_hop} = 2$ if the higher layer parameter frequencyHoppingOffsetLists contains four offset values $\lceil \log_2(N_{RB}^{UL,BWP}(N_{RB}^{UL,BWP}+1)/2\rceil - N_{UL-hop}$ bits provides the frequency domain resource allocation according to Subclause 6.1.2.2.2 of [6, TS 38.214]

For non-PUSCH hopping with resource allocation type 1:

$\lceil \log_2(N_{RB}^{UL,BWP}(N_{RB}^{UL,BWP}+1)/2\rceil$ bits provides the frequency domain resource allocation according to Subclause 6.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment - 0, 1, 2, 3, or 4 bits as defined in Subclause 6.1.2.1 of [6, TS38.214]. The bitwidth for this field is determined as [log, (I)] bits, where I is the number of entries in the higher layer parameter pusch-TimeDomainAllocationList if the higher layer parameter is configured; otherwise I is the number of entries in the default table.

Frequency hopping flag - 0 or 1 bit:

0 bit if only resource allocation type 0 is configured or if the higher layer parameter frequencyHopping is not configured;

1 bit according to Table 7.3.1.1.1-3 otherwise, only applicable to resource allocation type 1, as defined in Subclause 6.3 of [6, TS 38.214].

Modulation and coding scheme - 5 bits as defined in Subclause 6.1.4.1 of [6, TS 38.214]

New data indicator - 1 bit

Redundancy version - 2 bits as defined in Table 7.3.1.1.1-2

HARQ process number - 4 bits $1^{st}$ downlink assignment index - 1 or 2 bits:

1 bit for semi-static HARQ-ACK codebook;

2 bits for dynamic HARQ-ACK codebook.

$2^{nd}$ downlink assignment index - 0 or 2 bits:

2 bits for dynamic HARQ-ACK codebook with two HARQ-ACK sub-codebooks;

0 bit otherwise.

TPC command for scheduled PUSCH - 2 bits as defined in Subclause 7.1.1 of [5, TS38.213]

SRS resource indicator - $\left\lceil \log_2\left(\sum_{k=1}^{\min\{L_{max},N_{SRS}}\binom{N_{SRS}}{k}\right)\right\rceil$ or $\lceil \log_2(N_{SRS})\rceil$ bits where $N_{SRS}$ is the number of configured SRS resources in the SRS resource set associated with the higher layer parameter usage of value 'codeBook' or 'nonCodeBook', TABLE 5-continued $\left\lceil \log_2\left(\sum_{k=1}^{\min\{L_{max},N_{SRS}\}}\binom{N_{SRS}}{k}\right)\right\rceil$ bits according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'nonCodeBook' and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS})\rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.

Precoding information and number of layers - number of bits determined by the following:

0 bits if the higher layer parameter txConfig = nonCodeBook;

0 bits for 1 antenna port and if the higher layer parameter txConfig = codebook;

4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;

2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;

2 or 4 bits according to Table7.3.1.1.2-4 for 2 antenna ports, if txConfig = codebook, and according to whether transform precoder is enabled or disabled, and the values of higher layer parameters maxRank and codebookSubset;

1 or 3 bits according to Table7.3.1.1.2-5 for 2 antenna ports, if txConfig = codebook, and according to whether transform precoder is enabled or disabled, and the values of higher layer parameters maxRank and codebookSubset.

Antenna ports - number of bits determined by the following 2 bits as defined by Tables 7.3.1.1.2-6, if transform precoder is enabled, dmrs-Type = 1, and maxLength = 1;

4 bits as defined by Tables 7.3.1.1.2-7, if transform precoder is enabled, dmrs-Type = 1, and maxLength = 2;

3 bits as defined by Tables 7.3.1.1.2-8/9/10/11, if transform precoder is disabled, dmrs-Type = 1, and maxLength = 1, and the value of rank is determined according to the SRS resource indicator field if the higher layer parameter txConfig = nonCodebook and according to the Precoding information and number of layers field if the higher layer parameter txConfig = codebook;

4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook;

4 bits as defined by Tables 7.3.1.1.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook;

5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook.

where the number of CDM groups without data of values 1, 2, and 3 in Tables 7.3.1.1.2-6 to 7.3.1.1.2-23 refers to CDM groups {0}, {0, 1}, and {0, 1, 2} respectively.

If a UE is configured with both dmrs-UplinkForPUSCH-MappingTypeA and dmrs-UplinkForPUSCH-MappingTypeB, the bitwidth of this field equals max $\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.

SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

CSI request - 0, 1, 2, 3, 4, 5, or 6 bits determined by higher layer parameter reportTriggerSize.

CBG transmission information (CBGTI) - 0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.

TABLE 5-continued

| |
|---|
| PTRS-DMRS association - number of bits determined as follows |
| 0 bit if PTRS-UplinkConfig is not configured and transform precoder is disabled, or if transform precoder is enabled, or if maxRank = 1; |
| 2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field. |
| If “Bandwidth part indicator” field indicates a bandwidth part other than the active bandwidth part and the “PTRS-DMRS association” field is present for the indicated bandwidth part but not present for the active bandwidth part, the UE assumes the “PTRS-DMRS association” field is not present for the indicated bandwidth part. |
| beta_offset indicator - 0 if the higher layer parameter betaOffsets = semiStatic; otherwise 2 bits as defined by Table 9.3-3 in [5, TS 38.213]. |
| DMRS sequence initialization - 0 bit if transform precoder is enabled; 1 bit if transform precoder is disabled. |
| UL-SCH indicator - 1 bit. A value of “1” indicates UL-SCH shall be transmitted on the PUSCH and a value of “0” indicates UL-SCH shall not be transmitted on the PUSCH. Except for DCI format 0_1 with CRC scrambled by SP-CSI-RNTI, a UE is not expected to receive a DCI format 0_1 with UL-SCH indicator of “0” and CSI request of all zero(s). |

DCI format 1_0 may be used as fallback DCI for scheduling PDSCH, and in this case, CRC may be scrambled to C-RNTI. DCI format 1_0 in which CRC is scrambled to C-RNTI may include, e.g., the information shown in Table 6 below.

TABLE 6

| |
|---|
| Identifier for DCI formats - 1 bits |
| The value of this bit field is always set to 1, indicating a DL DCI format |
| Frequency domain resource assignment - $\lceil \log_2(N_{RB}^{DL,BWP}(N_{RB}^{DL,BWP}+1)/2\rceil$ bits where $N_{RB}^{DL,BWP}$ is given by subclause 7.3.1.0 |
| If the CRC of the DCI format 1_0 is scrambled by C-RNTI and the “Frequency domain resource assignment” field are of all ones, the DCI format 1_0 is for random access procedure initiated by a PDCCH order, with all remaining fields set as follows: |
| Random Access Preamble index - 6 bits according to ra-PreambleIndex in Subclause 5.1.2 of [8, TS38.321] |
| UL/SUL indicator - 1 bit. If the value of the “Random Access Preamble index” is not all zeros and if the UE is configured with supplementaryUplink in ServingCellConfig in the cell, this field indicates which UL carrier in the cell to transmit the PRACH according to Table 7.3.1.1.1-1; otherwise, this field is reserved |
| SS/PBCH index - 6 bits. If the value of the "Random Access Preamble index" is not all zeros, this field indicates the SS/PBCH that shall be used to determine the RACH occasion for the PRACH transmission; otherwise, this field is reserved. |
| PRACH Mask index - 4 bits. If the value of the "Random Access Preamble index” is not all zeros, this field indicates the RACH occasion associated with the SS/PBCH indicated by “SS/PBCH index” for the PRACH transmission, according to Subclause 5.1.1 of [8, TS38.321]; otherwise, this field is reserved |
| Reserved bits - 10 bits |
| Otherwise, all remaining fields are set as follows: |
| Time domain resource assignment - 4 bits as defined in Subclause 5.1.2.1 of [6, TS 8.214] |
| VRB-to-PRB mapping - 1 bit according to Table 7.3.1.2.2-5 |
| Modulation and coding scheme - 5 bits as defined in Subclause 5.1.3 of [6, TS 38.214] |
| New data indicator - 1 bit |
| Redundancy version - 2 bits as defined in Table 7.3.1.1.1-2 |
| HARQ process number - 4 bits |
| Downlink assignment index - 2 bits as defined in Subclause 9.1.3 of [5, TS 38.213], as counter DAI |
| TPC command for scheduled PUCCH - 2 bits as defined in Subclause 7.2.1 of [5, TS 38.213] |
| PUCCH resource indicator - 3 bits as defined in Subclause 9.2.3 of [5, TS 38.213] |
| PDSCH-to-HARQ feedback timing indicator - 3 bits as defined in Subclause 9.2.3 of [5, TS38.213] |

DCI format 1_1 may be used as non-fallback DCI for scheduling PDSCH, and in this case, CRC may be scrambled to C-RNTI. DCI format 1_1 in which CRC is scrambled to C-RNTI may include, e.g., the information shown in Table 7 below.

TABLE 7

Identifier for DCI formats - 1 bits

The value of this bit field is always set to 1, indicating a DL DCI format

Carrier indicator - 0 or 3 bits as defined in Subclause 10.1 of [5, TS 38.213].

Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where $n_{RWP} = n_{RWP,RRC} + 1$ if $n_{BWP,RRC} \leq 3$, in which case the bandwidth part indicator is equivalent to the ascending order of the higher layer parameter BWP-Id;

otherwise $n_{BWP} = n_{BWP,RRC}$, in which case the bandwidth part indicator is defined in Table 7.3.1.1.2-1;

If a UE does not support active BWP change via DCI, the UE ignores this bit field.

Frequency domain resource assignment - number of bits determined by the following, where $N_{RB}^{DL,BWP}$ is the size of the active DL bandwidth part:

$N_{RBG}$ bits if only resource allocation type 0 is configured, where $N_{RBG}$ is defined in Subclause 5.1.2.2.1 of [6, TS38.214], $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil, N_{RBG}) + 1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 5.1.2.2.1 of [6, TS 38.214].

For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.

VRB-to-PRB mapping - 0 or 1 bit:

0 bit if only resource allocation type 0 is configured or if interleaved VRB-to-PRB mapping is not configured by high layers;

1 bit according to Table 7.3.1.2.2-5 otherwise, only applicable to resource allocation type 1, as defined in Subclause 7.3.1.6 of [4, TS 38.211].

PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].

Rate matching indicator - 0, 1, or 2 bits according to higher layer parameters rateMatchPatternGroup1 and rate MatchPatternGroup2, where the MSB is used to indicate rateMatchPatternGroup1 and the LSB is used to indicate rateMatchPatternGroup2 when there are two groups.

ZP CSI-RS trigger - 0, 1, or 2 bits as defined in Subclause 5.1.4.2 of [6, TS 38.214]. The bitwidth for this field is determined as $\lceil \log_2(n_{ZP}+1) \rceil$ bits, where $n_{ZP}$ is the number of aperiodic ZP CSI-RS resource sets configured by higher layer.

For transport block 1:

Modulation and coding scheme - 5 bits as defined in Subclause 5.1.3.1 of [6, TS 38.214]

New data indicator - 1 bit

Redundancy version - 2 bits as defined in Table 7.3.1.1.1-2

For transport block 2 (only present if maxNrofCodeWordsScheduledByDCI equals 2):

Modulation and coding scheme - 5 bits as defined in Subclause 5.1.3.1 of [6, TS 38.214]

New data indicator - 1 bit

Redundancy version - 2 bits as defined in Table 7.3.1.1.1-2

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields TABLE 7-continued

| |
|---|
| of transport block 2 for the indicated bandwidth part. |
| HARQ process number - 4 bits |
| Downlink assignment index - number of bits as defined in the following |
| 4 bits if more than one serving cell are configured in the DL and the higher layer parameter pdsch-HARQ-ACK-Codebook=dynamic, where the 2 MSB bits are the counter DAI and the 2 LSB bits are the total DAI; |
| 2 bits if only one serving cell is configured in the DL and the higher layer parameter pdsch-HARQ-ACK-Codebook=dynamic, where the 2 bits are the counter DAI; |
| 0 bits otherwise. |
| TPC command for scheduled PUCCH - 2 bits as defined in Subclause 7.2.1 of [5, TS 38.213] |
| PUCCH resource indicator - 3 bits as defined in Subclause 9.2.3 of [5, TS 38.213] |
| PDSCH-to-HARQ_feedback timing indicator - 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK. |
| Antenna port(s) - 4, 5, or 6 bits as defined by Tables 7.3.1.2.2-1/2/3/4, where the number of CDM groups without data of values 1, 2, and 3 refers to CDM groups {0}, {0, 1}, and {0, 1, 2} respectively. The antenna ports $\{p_0, \ldots, p_{\upsilon-1}\}$ shall be determined according to the ordering of DMRS port(s) given by Tables 7.3.1.2.2-1/2/3/4. |
| If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $\lvert x_A - x_B \rvert$ zeros are padded in the MSB of this field, if the mapping type of the PDSCH corresponds to the smaller value of $x_A$ and $x_B$. |
| Transmission configuration indication - 0 bit if higher layer parameter tci-PresentInDCI is not enabled; otherwise 3 bits as defined in Subclause 5.1.5 of [6, TS38.214]. |
| If "Bandwidth part indicator" field indicates a bandwidth part other than the active bandwidth part, |
| if the higher layer parameter tci-PresentInDCI is not enabled for the CORESET used for the PDCCH carrying the DCI format 1_1, |
| the UE assumes tci-PresentInDCI is not enabled for all CORESETs in the indicated bandwidth part; |
| otherwise, |
| the UE assumes tci-PresentInDCI is enabled for all CORESETs in the indicated bandwidth part. |
| SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214]. |
| CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH. |
| CBG flushing out information (CBGFI) - 1 bit if higher layer parameter codeBlockGroupFlushIndicator is configured as "TRUE", 0 bit otherwise. |
| DMRS sequence initialization - 1 bit. |

<Time Domain Resource Allocation>

Hereinafter, a method for allocating time domain resources for a data channel in a 5G wireless communication system is described.

The base station may configure the UE with a table for time domain resource allocation for a downlink data channel (PDSCH) and an uplink data channel (PUSCH) via higher layer signaling (e.g., RRC signaling).

For PDSCH, a table including up to maxNrofDL-Allocations=16 entries may be configured and, for PUSCH, a table including up to maxNrofUL-Allocations=16 entries may be configured. The time domain resource allocation information may include at least one of, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH. For example, information as illustrated in Tables 8 and 9 below may be provided from the base station to the UE.

TABLE 8

PDSCH-TimeDomainResourceAllocationList information element

```
PDSCH-TimeDomainResourceAllocationList    ::=  SEQUENCE    (SIZE (1..maxNrofDL-
Allocations) ) OF PDSCH-TimeDomainResourceAllocation
PDSCH-TimeDomainResourceAllocation    ::=    SEQUENCE {
  k0                                                    INTEGER (0..32)
OPTIONAL,    -- Need S
mappingType                     ENUMERATED {typeA, typeB},
startSymbolAndLength              INTEGER (0..127)
}
```

Here, K0 indicates the PDCCH-to-PDSCH timing in the slot unit, mappingType indicates the PDSCH mapping type, and startSymbolAndLength indicates the start symbol and length of the PDSCH.

TABLE 9

PDSCH-TimeDomainResourceAllocationList information element

```
PDSCH-TimeDomainResourceAllocationList    ::=    SEQUENCE    (SIZE (1..maxNrofDL-
Allocations) ) OF PDSCH-TimeDomainResourceAllocation
PDSCH-TimeDomainResourceAllocation    ::=    SEQUENCE {
  k2                              INTEGER (0..32)    OPTIONAL,    -- Need S
  mappingType                   ENUMERATED {typeA, typeB},
  startSymbolAndLength            INTEGER (0..127)
}
```

Here, K2 indicates the PDCCH-to-PUSCH timing in the slot unit, mappingType indicates the PUSCH mapping type, and startSymbolAndLength indicates the start symbol and length of the PUSCH.

The base station may provide the UE with one of the entries in the table for the time domain resource allocation information via layer 1 (L1) signaling (e.g., DCI) (e.g., it may be indicated with the 'time domain resource allocation' field in the DCI). The UE may obtain time domain resource allocation information for the PDSCH or PUSCH based on the DCI received from the base station.

<Frequency Domain Resource Allocation>

Hereinafter, a method for allocating frequency domain resources for a data channel in a 5G wireless communication system is described.

The 5G wireless communication system supports two types, i.e., resource allocation type 0 and resource Supports allocation type 1, as methods for indicating frequency domain resource allocation information for the physical downlink shared channel (PDSCH) and the physical uplink shared channel (PUSCH).

Resource Allocation Type 0

RB allocation information may be provided from the base station to the UE in the form of a bitmap for a resource block group (RBG). In this case, the RBG may be composed of a set of contiguous virtual RBs, and the size P of the RBG may be determined based on a value set as a higher layer parameter (rbg-Size) and the bandwidth part size defined in Table 10 below.

TABLE 10

| Nominal RBG size P | | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

Here, the total number ($N_{RBG}$) of RBGs in bandwidth part i with a size of $$N_{BWP,i}^{size} \text{ is } N_{RBG} = \left\lceil \left(N_{BWP,i}^{size} + \left(N_{BWP,i}^{start} \bmod P\right)\right)/P \right\rceil.$$

Here, the size of the first RBG is $$RBG_0^{size} = P - N_{BWP,i}^{start} \bmod P.$$

The size $$RBG_{last}^{size}$$

of the last RBG is $$RBG_{last}^{size} = \left(N_{BWP,i}^{start} + N_{BWP,i}^{size}\right) \bmod P$$

if $$\left(N_{BWP,i}^{start} + N_{BWP,i}^{size}\right) \bmod P > 0,$$

otherwise $$RBG_{last}^{size}$$

is P. The size of the RBGs other than the RBG is P.

$$N_{RBG} = \lceil (N_{BWP,i}^{size} + (N_{BWP,i}^{start} \bmod P))/P \rceil,$$

where the size of the first RBG is $$RBG_0^{size} = P - N_{BWP,i}^{start} \bmod P,$$

the size of last RBG is $$RBG_{last}^{size} = (N_{BWP,i}^{start} + N_{BWP,i}^{size}) \bmod P$$

if $$(N_{BWP,i}^{start} + N_{BWP,i}^{size}) \bmod P > 0$$

and P otherwise, the size of all other RBGs is P.

Each bit in the bitmap with a size of $N_{RBG}$ bits may correspond to its respective RBG. The RBGs may be indexed in ascending order of frequency, starting from the position of lowest position of the bandwidth part. For $N_{RBG}$ RBGs in the bandwidth part, RBG #0 to RBG #($N_{RBG}$−1) may be mapped to the most significant bit (MSB) to the least significant bit (LSB) of the RBG bitmap. When a specific bit value in the bitmap is 1, the UE may determine that an RBG corresponding to the bit value has been assigned and, when the specific bit value in the bitmap is 0, the UE may determine that no RBG is assigned corresponding to the bit value.

Resource Allocation Type 1

RB allocation information may be provided from the base station to the UE, as information for the start position and length for the VRBs contiguously assigned. In this case, interleaving or non-interleaving may be further applied to the contiguously assigned VRBs. The resource allocation field of resource allocation field type 1 may be configured with a resource indication value (RIV), and the RIV may be composed of the start position ($RB_{start}$) of the VRBs and the length ($L_{RBs}$) of the contiguously allocated RBs. In an embodiment, the RIV in the bandwidth part of the $$N_{BWP}^{size}$$

size may be defined as below.

$$\text{if } (L_{RBs} - 1) \le \lfloor N_{BWP}^{size}/2 \rfloor \text{ then}$$

-continued $$RIV = N_{BWP}^{size}(L_{RBs} - 1) + RB_{start}$$

else $$RIV = N_{BWP}^{size}(N_{BWP}^{size} - L_{RBs} + 1) + (N_{BWP}^{size} - 1 - RB_{start})$$

where $L_{RBs} \geq 1$ and shall not exceed $$N_{BWP}^{size} - RB_{start}.$$

The base station may configure the UE with a resource allocation type through higher layer signaling (e.g., the higher layer parameter resourceAllocation may be set to one of resourceAllocationType0, resourceAllocationType1, or dynamicSwitch). If the UE has been configured with both resource allocation types 0 and 1 (or if the higher layer parameter resourceAllocation is set to dynamicSwitch in the same manner), it may indicate whether the bit corresponding to the most significant bit (MSB) of the field indicating resource allocation in the DCI format indicating scheduling is resource allocation type 0 or resource allocation type 1. Further, the resource allocation information may be indicated through the remaining bits except for the bit corresponding to the MSB based on the indicated resource allocation type, and the UE may interpret the resource allocation field information of the DCI field based thereupon. If the UE is configured with either resource allocation type 0 or resource allocation type 1 (or if the higher layer parameter resourceAllocation is set to either resourceAllocationType0 or resourceAllocationType1 in the same manner), resource allocation information may be indicated based on the resource allocation type in which a field is configured indicating the resource allocation in the DCI format indicating scheduling and, based thereupon, the UE may interpret the resource allocation field information for the DCI field.

<MCS>

A modulation and coding scheme used in the 5G wireless communication system is described below.

In 5G, a plurality of MCS index tables are defined for PDSCH and PUSCH scheduling. Which MCS table is to be assumed among the plurality of MCS tables may be set or indicated through higher layer signaling or L1 signaling from the base station to the UE or through the RNTI assumed by the UE upon PDCCH decoding.

The MCS index table for PDSCH and CP-OFDM-based PUSCH (or PUSCH without transform precoding) may be as shown in Table 11 below.

TABLE 11

Table 5.1.3.1-1: MCS index table 1 for PDSCH

| MCS Index $I_{MCS}$ | Modulation Order $Q_m$ | Target code Rate R × 1024 | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |

TABLE 11-continued

| Table 5.1.3.1-1: MCS index table 1 for PDSCH | | | |
|---|---|---|---|
| MCS Index $I_{MCS}$ | Modulation Order $Q_m$ | Target code Rate R × 1024 | Spectral efficiency |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

The MCS index table for PDSCH and CP-OFDM-based PUSCH (or PUSCH without transform precoding) may be as shown in Table 12.

TABLE 12

| Table 5.1.3.1-2: MCS index table 2 for PDSCH | | | |
|---|---|---|---|
| MCS Index $I_{MCS}$ | Modulation Order $Q_m$ | Target code Rate R × 1024 | Spectral efficiency |
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

The MCS index table for PDSCH and CP-OFDM-based PUSCH (or PUSCH without transform precoding) may be as shown in Table 13 below.

TABLE 13

| Table 5.1.3.1-3: MCS index table 3 for PDSCH | | | |
|---|---|---|---|
| MCS Index $I_{MCS}$ | Modulation Order $Q_m$ | Target code Rate R × 1024 | Spectral efficiency |
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS index Table 1 for DFT-s-OFDM-based PUSCH (or PUSCH with transform precoding) may be as shown in Table 14.

TABLE 14

| Table 6.1.4.1-1: MCS index table for PUSCH with transform precoding and 64QAM | | | |
|---|---|---|---|
| MCS Index $I_{MCS}$ | Modulation Order $Q_m$ | Target code Rate R × 1024 | Spectral efficiency |
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |

TABLE 14-continued

Table 6.1.4.1-1: MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 28 | q | reserved | |
| 29 | 2 | reserved | |
| 30 | 4 | reserved | |
| 31 | 6 | reserved | |

MCS index Table 2 for DFT-s-OFDM-based PUSCH (or PUSCH with transform precoding) may be as shown in Table 15.

TABLE 15

Table 6.1.4.1-2: MCS index table 2 for PUSCH with transform precoding and 64QAM

| MCS Index $I_{MCS}$ | Modulation Order $Q_m$ | Target code Rate R × 1024 | Spectral efficiency |
|---|---|---|---|
| 0 | 9 | 60/q | 0.0586 |
| 1 | 9 | 80/q | 0.0781 |
| 2 | 9 | 100/q | 0.0977 |
| 3 | 9 | 128/q | 0.1250 |
| 4 | 9 | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3,9023 |
| 27 | 6 | 772 | 4.5234 |
| 28 | q | reserved | |
| 29 | 2 | reserved | |
| 30 | 4 | reserved | |
| 31 | 6 | reserved | |

The MCS index table for the PUSCH to which transform precoding or discrete Fourier transform (DFT) precoding and 64 QAM is applied may be as shown in Table 16 below.

TABLE 16

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |

TABLE 16-continued

| MCS Index $I_{MCS}$ | Modulation Order $Q_m$ | Target code Rate R × 1024 | Spectral efficiency |
|---|---|---|---|
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

The MCS index table for the PUSCH to which transform precoding or DFT precoding and 64 QAM is applied may be as shown in Table 17 below.

TABLE 17

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

<PDCCH>

A downlink control channel in the 5G wireless communication system is described below with reference to the drawings.

Figure 4:
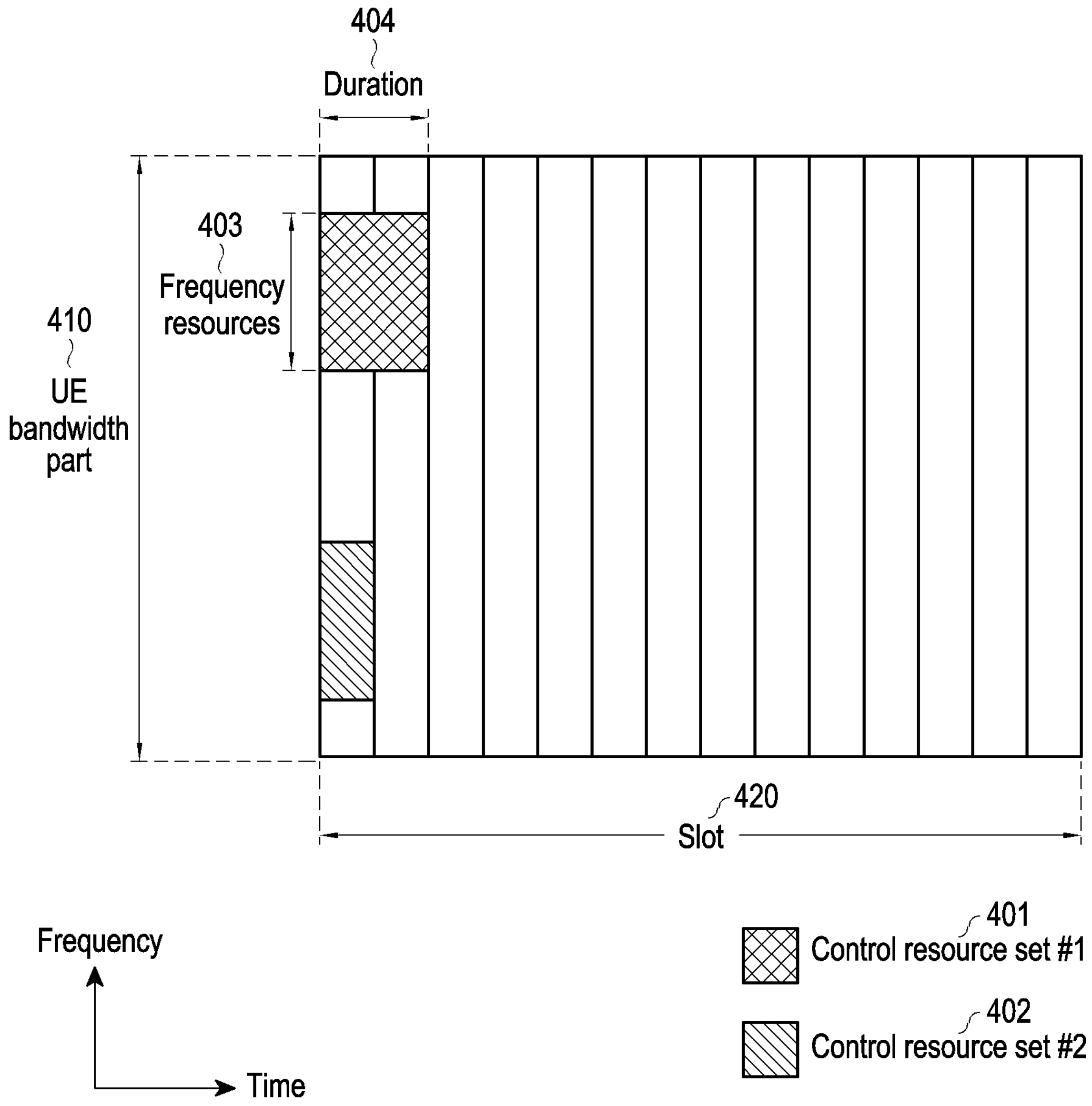
FIG. 4 is a view illustrating an example of a control resource set in which a downlink control channel is transmitted in a wireless communication system.

FIG. 4 is a view illustrating an example of a control resource set (CORESET) in which a downlink control channel is transmitted in a wireless communication system.

Referring to FIG. 4, a UE bandwidth part 410 is configured in the frequency domain, and two control resource sets, i.e., control resource set #1 401 and control resource set #2 402, are configured in one slot 420 in the time domain. The control resource sets 401 and 402 may be configured to a particular frequency resource 403 in the overall system bandwidth part 410 in the frequency domain. Further, the control resource set 401 and 402 may be configured with one or more OFDM symbols in the time domain, and the number of OFDM symbols may be defined as the control resource set length (CORESET duration) 404. In the shown example, control resource set #1 401 may be configured as a control resource set length of two symbols, and control resource set #2 402 may be configured as a control resource set length of one symbol.

Each control resource set described above may be configured by the base station to the UE through higher layer signaling, e.g., at least one of system information, MIB, or RRC signaling. Configuring the UE with the control resource set means providing at least one piece of information among the control resource set identity, frequency position of the control resource set, or symbol length of the control resource set. For example, the higher layer signaling information elements to configure the control resource set may include information as shown in Table 18.

TABLE 18

```
ControlResourceSet ::=                        SEQUENCE {
  -- Corresponds to L1 parameter 'CORESET-ID'
  controlResourceSetId
  ControlResourceSetId,
  frequencyDomainResources                    BIT STRING (SIZE (45)) ,
  duration                                                    INTEGER
(1..maxCoReSetDuration) ,
  cce-REG-MappingType                                        CHOICE {
    interleaved
  SEQUENCE {
                 reg-BundleSize
  ENUMERATED {n2, n3, n6],
                 precoderGranularity
  ENUMERATED {sameAsREG-bundle, allContiguousRBs},
                 interleaverSize
  ENUMERATED {n2, n3, n6}
                 shiftIndex
  INTEGER(0..maxNrofPhysicalResourceBlocks-1)
                                OPTIONAL
 },
  nonInterleaved                                        NULL
  },
  tci-StatesPDCCH
  SEQUENCE (SIZE (1..maxNrofTCI-StatesPDCCH) ) OF TCI-StateId
                 OPTIONAL,
  tci-PresentInDCI                    ENUMERATED
{enabled)
                    OPTIONAL,        -- Need S
}
```

Here, tci-StatesPDCCH is configuration information about the transmission configuration indication (TCI) states and may include one or more synchronization signal (SS)/physical broadcast channel (PBCH) block indexes or channel state information reference signal (CSI-RS) indexes having a quasi-co-located (QCL) relationship with the DMRS transmitted in the corresponding control resource set.

Figure 5:
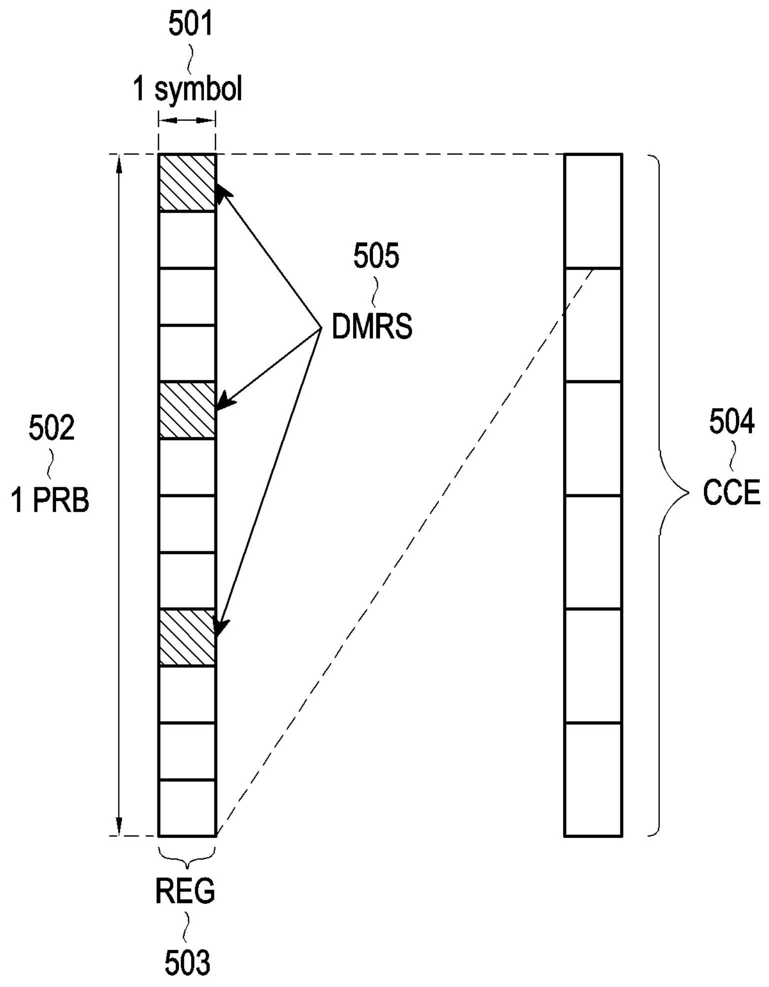
FIG. 5 is a view illustrating a structure of a time and frequency resource constituting a downlink control channel in a wireless communication system.

FIG. 5 is a view illustrating an example of a basic unit of time and frequency resource constituting a download control channel available in a wireless communication system.

Referring to FIG. 5, the basic unit of time and frequency resources constituting the downlink control channel may be referred to as a resource element group (REG) 503, and the REG 503 may be defined with one OFDM symbol 501 on the time axis and with one physical resource block (PRB) 502, i.e., 12 subcarriers, on the frequency axis. The base station may configure a downlink control channel allocation unit by concatenating at least one REG 503.

When the basic unit in which the downlink control channel is allocated is a control channel element (CCE) 504, one CCE 504 may be constituted of a plurality of REGs 503. In the example of the illustrated REG 503, the REG 503 may be constituted of 12 REs, and if one CCE 504 is constituted of six REGs 503, one CCE 504 may be constituted of 72 REs. The region where the downlink control resource set is configured may be constituted of a plurality of CCEs 504, and a specific downlink control channel may be mapped to one or more CCEs 504 according to the aggregation level (AL) in the control resource set and be transmitted. The CCEs 504 in the control resource set are distinguished with numbers, and in this case, the numbers of the CCEs 504 may be assigned according to a logical mapping scheme.

The basic unit of the downlink control channel, i.e., REG 503, may include both the region of the REs to which the DCI is mapped and the region where the DMRS 505 used to demodulate the DCI is mapped. At least one (three in the illustrated example) DMRS 505 may be transmitted in one REG 503. The number of CCEs necessary to transmit a PDCCH may be, e.g., 1, 2, 4, 8, or 16 depending on the aggregation level (AL), and different numbers of CCEs may be used to implement link adaptation of downlink control channel. For example, if AL=L, one downlink control channel may be transmitted via L CCEs.

The UE needs to detect a signal in the control resource set while being unaware of information for downlink control channel and, for such blind decoding, a search space is defined which indicates a set of CCEs. The search space is a set of candidate control channels constituted of CCEs that the UE needs to attempt to decode on the given aggregation level, and since there are several aggregation levels to bundle up 1, 2, 4, 8, or 16 CCEs, the UE has a plurality of search spaces. A search space set (Set) may be defined as a set of search spaces at all set aggregation levels.

<Search Space>

Search spaces for PDCCH may be classified into a common search space and a UE-specific search space. A predetermined group of UEs or all the UEs may search for the common search space to receive cell-common control information, e.g., paging message, or dynamic scheduling for system information. For example, PDSCH scheduling allocation information for transmission of the SIB including cell service provider may be detected by inspecting the common search space. The common search space may be defined as a set of pre-agreed CCEs to allow a predetermined group of UEs or all the UEs to receive the PDCCH. Scheduling allocation information for the UE-specific PDSCH or PUSCH may be received by inspecting the UE-specific search space. The UE-specific search space may be UE-specifically defined with a function of various system parameters and the identity of the UE.

In the 5G wireless communication system, the parameters for the search space for the PDCCH may be configured in the UE by the base station through higher layer signaling (e.g., SIB, MIB, or RRC signaling). For example, the base station may configure the UE with, e.g., the number of PDCCH candidates at each aggregation level L, monitoring period for search space, monitoring occasion of symbol unit in slot for search space, search space type (common search space or UE-specific search space), combination of RNTI and DCI format to be monitored in the search space, or control resource set index to be monitored in the search space. For example, the higher layer signaling information elements to configure the search space of the PDCCH may include the parameters as shown in Table 19.

TABLE 19

```
SearchSpace ::=                       SEQUENCE {
  searchSpaceId                                         SearchSpaceId,
  controlResourceSetId
  ControlResourceSetId,
  monitoringSlotPeriodicityAndOffset  CHOICE {
    sl1                                                 NULL,
    sl2                                                 INTEGER (0..1),
    sl4                                                 INTEGER (0..3),
    sl5                                                 INTEGER (0..4),
    sl8                                                 INTEGER (0..7),
    sl10                                                INTEGER (0..9),
    sl16                                                INTEGER (0..15),
    sl20                                                INTEGER (0..19)
    . . .
  }
duration            INTEGER (2..2559)
  monitoringSymbolsWithinSlot        BIT STRING (SIZE (14) )          OPTIONAL,
  nrofCandidates                      SEQUENCE {
    aggregationLevel1     ENUMERATED (n0, n1, n2, n3, n4, n5, n6, n8},
    aggregationLevel2     ENUMERATED (n0, n1, n2, n3, n4, n5, n6, n8},
    aggregationLevel4     ENUMERATED {n0, n1, n2, n3, n4, n5, n6, n8},
    aggregationLevel8     ENUMERATED {n0, n1, n2, n3, n4, n5, n6, n8},
    aggregationLevel16    ENUMERATED (n0, n1, n2, n3, n4, n5, n6, n8}
  },
  searchSpaceType                     CHOICE {
    common                            SEQUENCE {
    . . .
  }
    ue-Specific                       SEQUENCE {
    dci-Formats ENUMERATED {formats0-0-And-1-0, formats0-1-And-1-1},
    . . .
  }
```

According to the configuration information, the base station may configure one or more search space sets to the UE. The base station may configure the UE with search space set 1 and search space set 2 and configure it to monitor DCI format A, scrambled to X-RNTI in search space set 1, in the common search space and to monitor DCI format B, scrambled to Y-RNTI in search space set 2, in the UE-specific search space.

According to the above-described configuration information, one or more search space sets may be present in the common search space or the UE-specific search space. For example, search space set #1 and search space set #2 may be configured as the common search space, and search space set #3 and search space set #4 may be configured as the UE-specific search space.

In the common search space, e.g., a combination of DCI format and RNTI as follows may be monitored. Of course, it is not limited to the examples described below.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, e.g., a combination of DCI format and RNTI as follows may be monitored. Of course, it is not limited to the examples described below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs may be defined and used as follows.

C-RNTI (cell RNTI): for scheduling UE-specific PDSCH

Modulation coding scheme C-RNTI (MCS-C-RNTI): for scheduling UE-specific PDSCH

Temporary cell RNTI (TC-RNTI): for scheduling UE-specific PDSCH

Configured scheduling RNTI (CS-RNTI): for scheduling semi-statically configured UE-specific PDSCH Random access RNTI (RA-RNTI): for scheduling PDSCH in the random access phase Paging RNTI (P-RNTI): for scheduling PDSCH where paging is transmitted System information RNTI (SI-RNTI): for scheduling PDSCH where system information is transmitted Interruption RNTI (INT-RNTI): for indicating whether to puncture PDSCH Transmit power control for PUSCH RNTI (TPC-PUSCH-RNTI): for indicating power control command for PUSCH Transmit power control for PUCCH RNTI (TPC-PUCCH-RNTI): for indicating power control command for PUCCH Transmit power control for SRS RNTI (TPC-SRS-RNTI): for indicating power control command for SRS The above-described DCI formats may follow the definitions in Table 20 below.

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G wireless communication system, the search space of the aggregation level L in the control resource set p and the search space set s may be expressed by Equation 1 below.

$$L\cdot\left\{\left(Y_{p,n^{\mu}_{s,f}}+\left\lfloor\frac{m_{s,n_{CI}}\cdot N_{CCE,p}}{L\cdot M^{(L)}_{p,s,max}}\right\rfloor+n_{CI}\right)\bmod\left\lfloor N_{CCE,p}/L\right\rfloor\right\}+i \qquad \text{Equation 1}$$

L: aggregation level $n_{CI}$: carrier index $N_{CCE,p}$: the total number of CCEs present in control resource set p $n^{\mu}_{s,f}$: slot index $M^{(L)}_{p,s,max}$: number of PDCCH candidates of aggregation level L $M_{snCI}=0, \ldots, M^{(L)}_{p,s,max}-1$: PDCCH candidate index of aggregation level L $i=0, \ldots, L-1$

–

$$Y_{p,n^{\mu}_{s,f}}=\left(A_p\cdot Y_{p,n^{\mu}_{s,f}-1}\right)\bmod D,\ Y_{p,-1}=n_{RNTI}\neq 0,$$

$$A_0=39827,\ A_1=39829,\ A_2=39839,\ D=65537$$

$N_{RNTI}$: UE identifier

Y_(p,$n^{\mu}_{s,f}$) may be 0 in the case of the common search space.

In the case of the UE-specific search space, Y (p,$n^{\mu}_{s,f}$) may have a value that changes depending on the UE's identity (C-RNTI or ID configured in the UE by the base station) and the time index.

Figure 6:
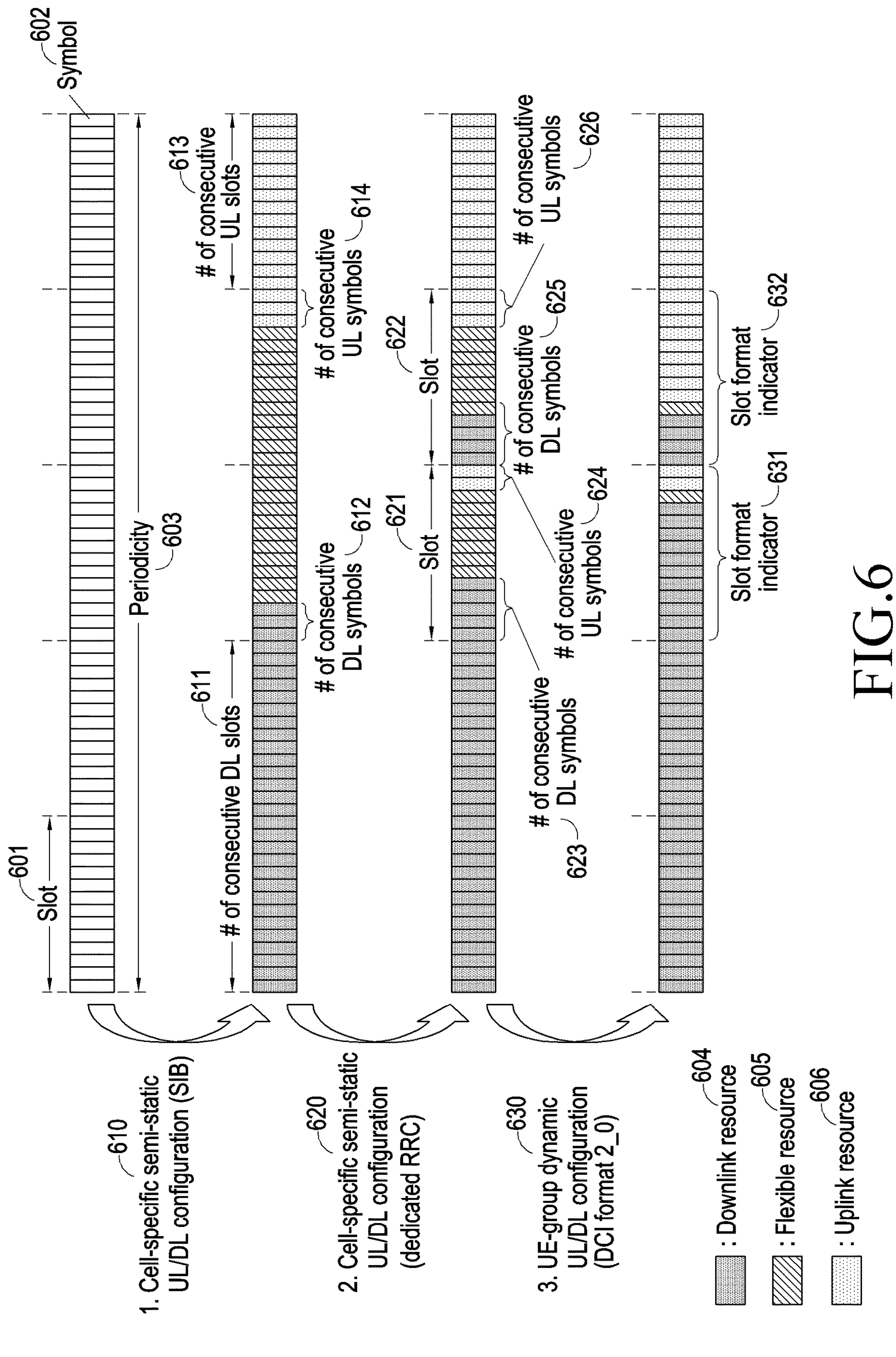
FIG. 6 is a view illustrating an example of an uplink-downlink configuration in a wireless communication system.

FIG. 6 is a view illustrating an example of an uplink-downlink configuration in a wireless communication system.

Referring to FIG. 6, a slot 601 may include 14 symbols 602. In the 5G communication system, the uplink-downlink configuration of symbol/slot may be configured in three phases.

First, the uplink-downlink configuration 610 of the symbol/slot may be semi-statically indicated through cell-specific configuration information through the system information in the symbol unit. In an embodiment, the cell-specific uplink-downlink configuration information may include uplink-downlink pattern information and reference subcarrier spacing information. The uplink-downlink pattern information may include the periodicity 603 at which one DL-UL pattern is applied, the number 611 of consecutive full DL slots at the beginning of each DL-UL pattern), the number 612 of consecutive DL symbols in the beginning of the slot following the last full DL slot, the number 613 of consecutive full UL slots at the end of each DL-UL pattern, or the number 614 of consecutive UL symbols in the end of the slot preceding the first full UL slot. In this case, slots and symbols not indicated by uplink or downlink may be determined as flexible slots/symbols.

Second, the UE-specific uplink-downlink configuration 620 for flexible slots or slots 621 and 622 including flexible symbols may be semi-statically indicated through UE-specific configuration information through dedicated higher layer signaling. Each slot/symbol may be configured as uplink or downlink by the number 623 or 625 of contiguous downlink symbols from the start symbol of the slot 621 or 622 and the number 624 or 626 of contiguous uplink symbols from the end of the slot or the entire slot may be configured as downlink or uplink.

Finally, the uplink-downlink configuration 630 for each UE group for the symbols not indicated as downlink or uplink through system information and UE-specific configuration information may be dynamically configured as downlink or uplink by the slot format indicator (SFI) 631 or 632 included in the downlink control channel. The slot format indicator 1631 or 632 may indicate one index selected from a preconfigured table showing uplink-downlink configurations of 14 symbols in one slot. The table may be as shown in Table 21 below, for example.

TABLE 21

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

TABLE 21-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

Additional coverage extension technology has been adopted for the 5G wireless communication service, as compared with the LTE communication service, but actual coverage of the 5G wireless communication service may use the time division duplex (TDD) technique appropriate for services which generally put more weight on downlink traffic. Further, as the center frequency increases to extend the frequency band, the coverage of the base station and the UE reduces. Thus, coverage enhancement is a key requirement for the 5G wireless communication service. In particular, overall, the UE transmit power is lower than the base station transmit power and, in the time domain, downlink takes a more proportion than uplink to support services that puts more weight on downlink traffic, so that coverage enhancement of uplink channel is a core requirement for the 5G wireless communication service.

The uplink channel coverage of the base station and UE may be physically enhanced by increasing the time resources of uplink channel, reducing the center frequency, or raising the UE transmit power. However, increasing time resources and changing frequency may be limited due to limitations on the frequency band predetermined by each network operator. Raising the UE transmit power may be limited due to the fact that the maximum transmit power is fixed by the standard to reduce interference.

Thus, to enhance base station and UE coverage, it is possible to divide the uplink resource and downlink resources in the time domain depending on the uplink and downlink traffic proportions like in the TDD system or to divide the uplink resource and downlink resource in the frequency domain like in the FDD system. In the disclosure, the system that may flexibly divide the uplink resource and downlink resource in the time domain and/or frequency domain may be referred to as an XDD system, flexible TDD system, hybrid TDD system, TDD-FDD system, hybrid TDD-FDD system, subband full duplex system, or dynamic TDD system and, for convenience of description, it is referred to as an XDD system below. In XDD, 'X' may mean time and/or frequency.

Figure 7A:
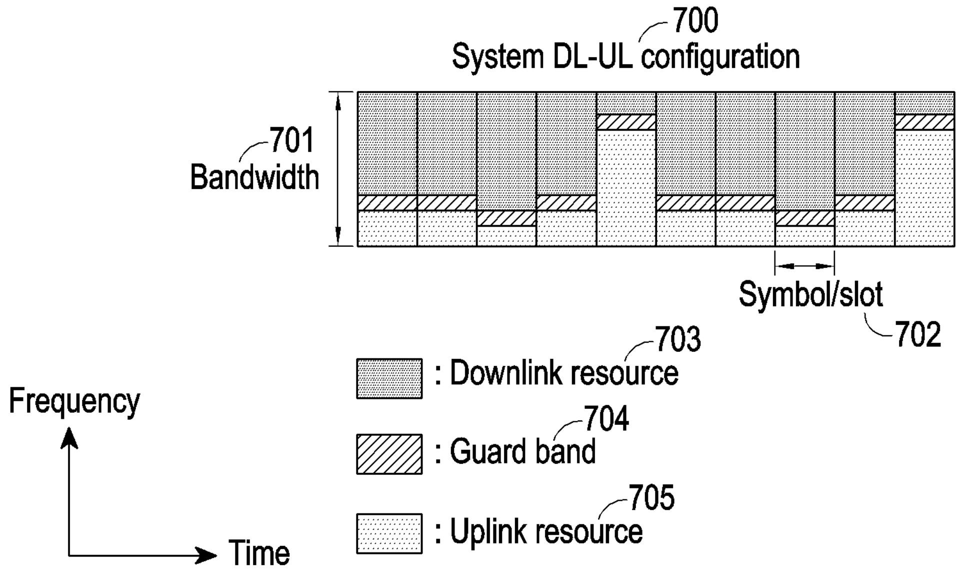
FIGS. 7A and 7B are views illustrating an example of an uplink-downlink configuration in an XDD system flexibly dividing uplink and downlink resources in a time and frequency domain according to an embodiment of the disclosure.
Figure 7B:
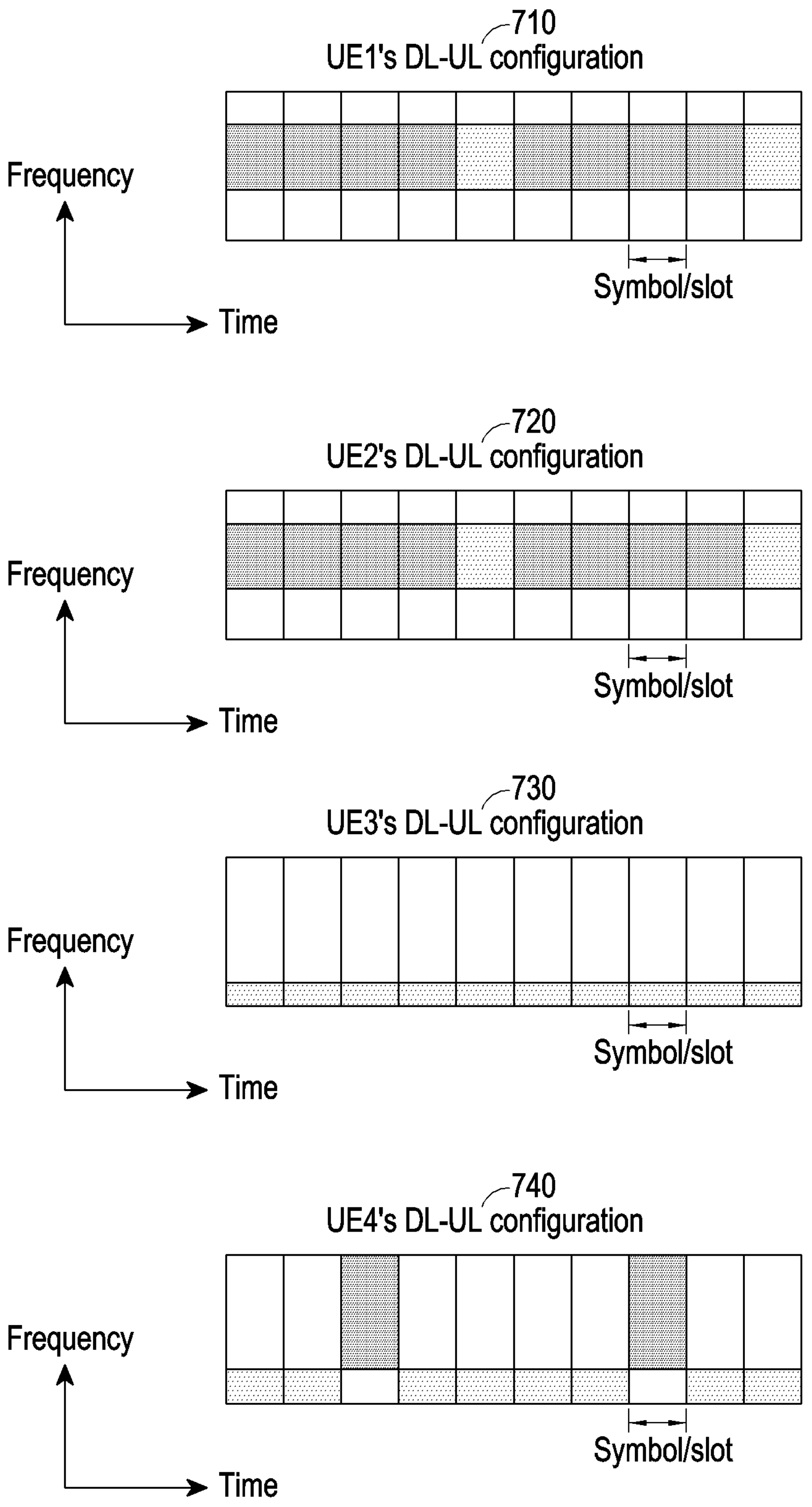

FIGS. 7A and 7B are views illustrating an uplink-downlink configuration in an XDD system flexibly dividing uplink and downlink resources in a time and frequency domain according to an embodiment of the disclosure.

Referring to FIG. 7A, the uplink-downlink configuration 700 of the base station may be configured so that each symbol or slot 702 is flexibly allocated to uplink or downlink depending on the uplink and downlink traffic proportions for the entire frequency band 701. In the frequency domain, a guard band 704 may be allocated between the downlink resource 703 and the uplink resource 705. The guard band 704 may be allocated to reduce interference with the uplink channel or signal by the out-of-band emission generated when the base station transmits a downlink channel or signal in the downlink resource 703.

Referring to FIG. 7B, UE1 710 and UE2 720 which have more traffic on downlink than on uplink may be allocated downlink and uplink resources in the ratio of 4:1 in the time domain by the configuration of the base station. UE3 730 which operates at the cell edge and is insufficient for uplink coverage may be allocated only uplink resources in some time ranges by the configuration of the base station. In the same time range, UE4 740 which operates at the cell edge and is thus insufficient for uplink coverage but has relatively much downlink and uplink traffic may be allocated more uplink resources in the time domain for uplink coverage and be allocated more downlink resources in the frequency domain. As in the above-described example, more downlink resources in the time domain may be allocated to UEs which operate relatively in the center of the cell, and more uplink resources in the time domain may be allocated to UEs which operate relatively at the cell edge and have insufficient uplink coverage.

Figure 8:
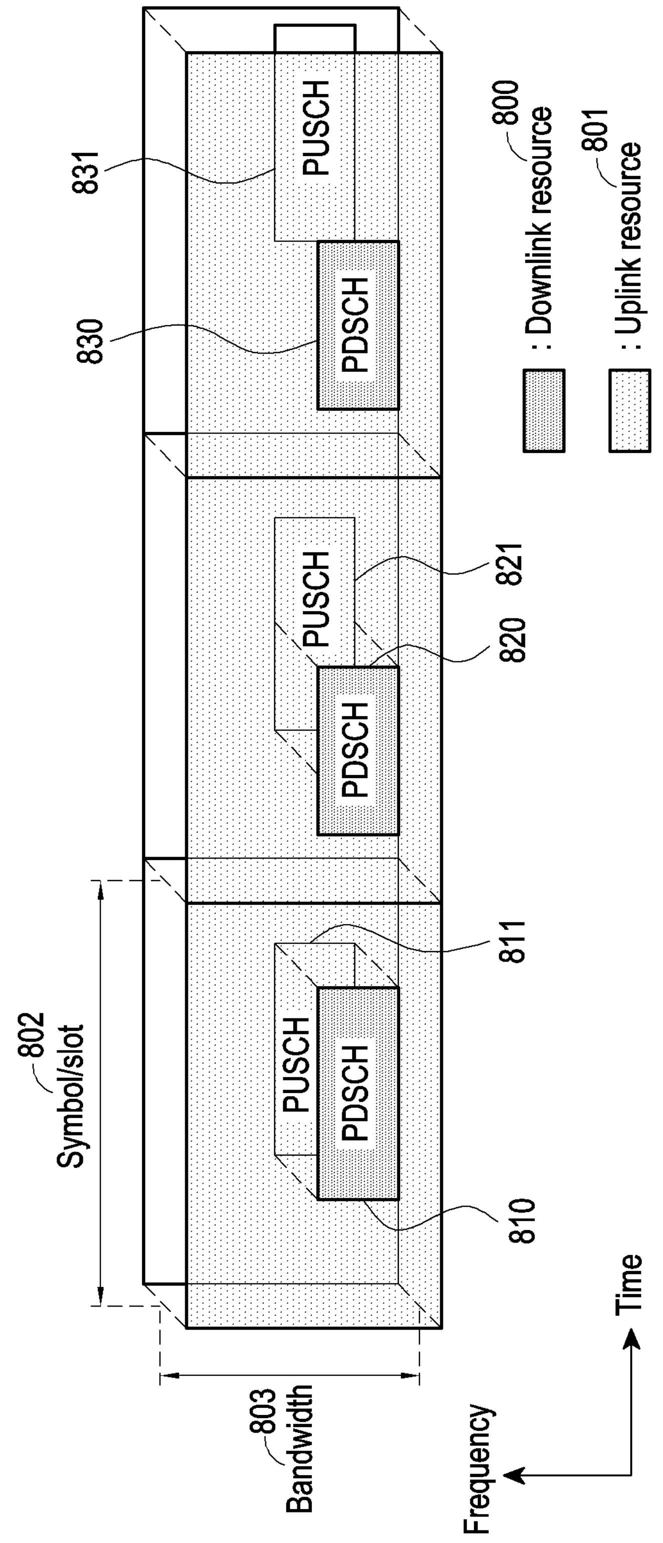
FIG. 8 is a view illustrating an example of an uplink-downlink configuration in a full-duplex communication system flexibly dividing uplink and downlink resources in a time and frequency domain according to an embodiment of the disclosure.

FIG. 8 is a view illustrating an example of an uplink-downlink configuration in a full-duplex communication system flexibly dividing uplink and downlink resources in a time and frequency domain according to an embodiment of the disclosure.

Referring to FIG. 8, the downlink resource 800 and the uplink resource 801 may wholly or partially overlap each other in the time domain and/or frequency domain. The downlink resource 800 and the uplink resource 801 allocated to the UE in the time resource corresponding to the symbol or slot 802 and the frequency resource corresponding to the bandwidth 803 may be configured to wholly or partially overlap each other. In the illustrated example, the PDSCH 810 allocated to the UE in the first symbol/slot completely overlaps the PUSCH 811 in the time and frequency domains. The PDSCH 820 allocated to the UE in the second symbol/slot partially overlaps the PUSCH 821 in the time domain and completely overlaps it in the frequency domain. The PDSCH 830 allocated to the UE in the third symbol/slot does not overlap or is adjacent to the PUSCH 831 in the time domain and partially overlaps it in the frequency domain.

Downlink transmission from the base station to the UE may be performed in the regions 810, 820, and 830 configured as the downlink resource 800, and uplink transmission from the UE to the base station may be performed in the regions 811, 821, and 831 configured as the uplink resource 801. In this case, when the downlink resource 800 and the uplink resource 801 at least partially overlap each other in the time and frequency domains, downlink and uplink transmission/reception of the base station or the UE in the same time and frequency resource may simultaneously occur (e.g., during at least one same OFDM symbol).

Figure 9:
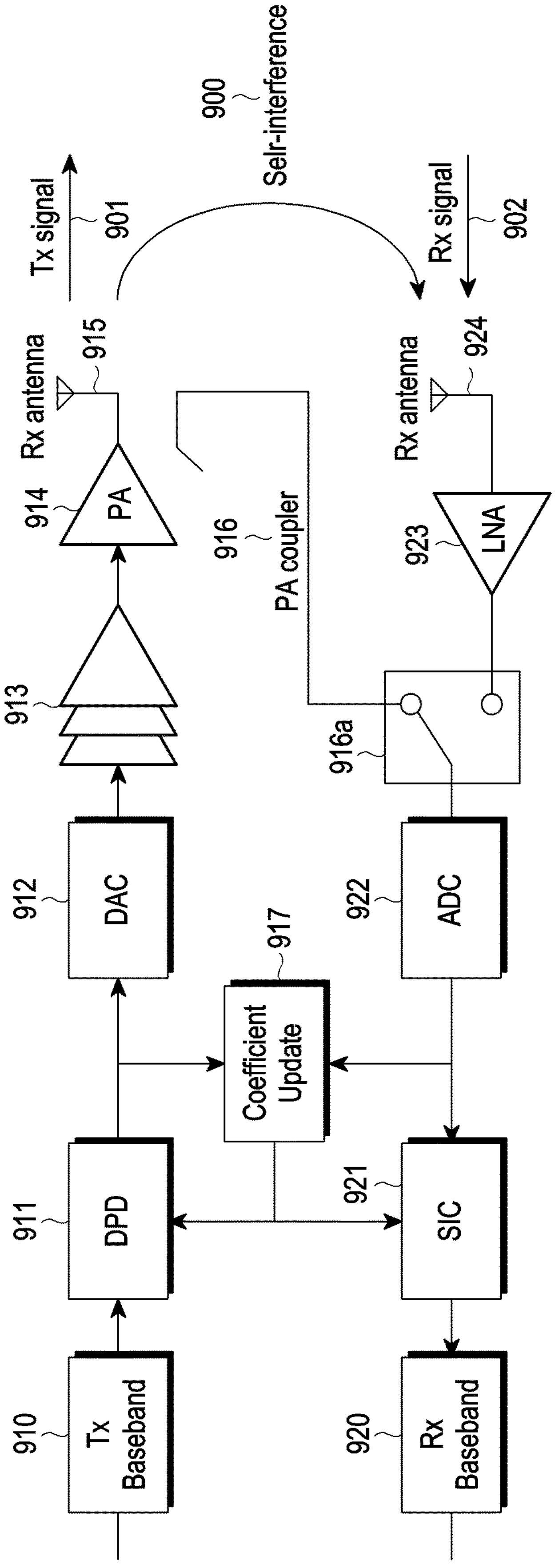
FIG. 9 is a view illustrating a structure of a transceiver supporting a full-duplex scheme according to an embodiment of the disclosure.

FIG. 9 is a view illustrating a structure of a transceiver to support a full-duplex scheme according to an embodiment of the disclosure. The structure of the transceiver shown in FIG. 9 may be applied to a base station device or a UE device and includes a transmit end (TX path) and a receive end (RX path) to be described below.

Referring to FIG. 9, the TX end may include a TX baseband processing block 910, a digital pre-distortion (DPD) block 911, a digital-to-analog converter (DAC) 912, a pre-driver 913, a power amplifier (PA) 914, and a TX antenna 915. Each of the blocks may perform the following roles.

The TX baseband processing block 910 may perform digital processing on the TX signal.

The digital pre-distortion block 911 may perform pre-distortion on the digital TX signal.

The DAC 912 may convert the digital signal into an analog signal.

The pre-driver 913 may perform gradual power amplification on the analog TX signal.

The power amplifier 914 may perform power amplification on the analog TX signal.

The TX antenna 915 may transmit the power-amplified signal 901.

Referring to FIG. 9, the RX end may include an RX antenna 924, a low noise amplifier (LNA) 923, an analog-to-digital converter (ADC) 922, a successive interference cancellation (SIC) block 921, and an RX baseband processing block 920. Each of the blocks may perform the following roles.

The RX antenna 924 may receive the RF band signal 902.

The low noise amplifier 923 may amplify the power the analog RX signal while minimizing noise amplification.

The ADC 922 may convert the analog signal into a digital signal.

The SIC block 921 may perform interference cancellation on the digital signal.

The RX baseband processing block 920 may perform digital processing on the interference-canceled signal.

A power amplifier (PA) coupler 916 and a coefficient update block 917 may be present for additional signal processing between the TX end and the RX end. Each of the blocks may perform the following roles.

The PA coupler 916 may detect the waveform of the analog TX signal which has undergone the power amplifier 914 to be observed at the RX end. The detected signal may be input to the ADC 922 by a switch 916*a*.

The coefficient update block 917 may update various coefficients necessary for digital signal processing at the TX end and RX end. The computed coefficients may be used to configure parameters necessary at the DPD 911 of the TX end and the SIC 921 of the RX end.

The transceiver structure shown in FIG. 9 may be utilized to effectively control interference between the TX signal and the RX signal when transmission and reception operations are simultaneously performed in the base station or UE device. For example, when transmission and reception are simultaneously performed in the transceiver, the TX signal 901 transmitted through the TX antenna 915 of the TX end may be received through the RX antenna 924 in which case the TX signal 901 received by the RX end may cause interference 900 with the RX signal 902 that the RX end intended to receive. The interference 900 between the TX signal 901 and the RX signal 902 is referred to as self-interference.

When the base station simultaneously performs downlink transmission and uplink reception, the downlink signal transmitted by the TX end of the base station may be received by the RX end of the base station so that interference (i.e., self-interference) may occur between the downlink signal transmitted from the base station and the uplink signal originally intended to be received at the RX end of the base station. Similarly, when the UE simultaneously performs downlink reception and uplink transmission, the uplink signal transmitted from the TX end of the UE may be received by the RX end of the UE so that interference (i.e., self-interference) may occur between the uplink signal transmitted from the UE and the downlink signal originally intended to be received at the RX end of the UE. As such, interference between links in different directions, i.e., downlink signal and uplink signal in the base station and the UE may be referred to as cross-link interference.

The self-interference between the TX signal (or downlink/uplink signal) and the RX signal (or uplink/downlink signal) may occur in the system where transmission and reception are simultaneously performed. As an example, self-interference may occur in the above-described XDD system.

Figure 10:
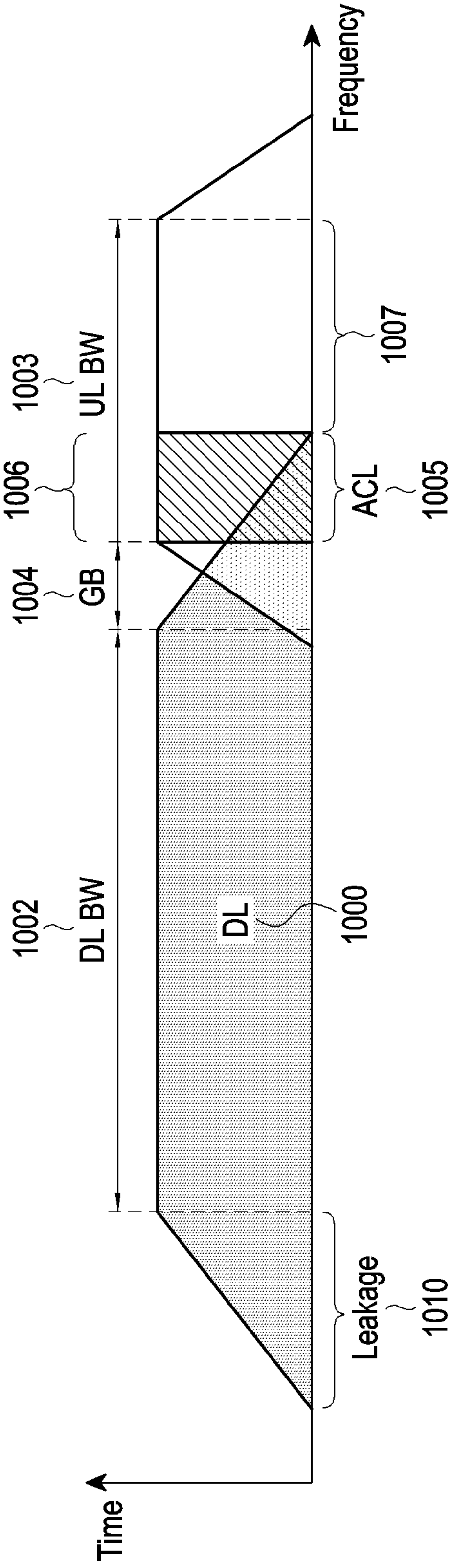
FIG. 10 is a view illustrating an example of self-interference between uplink and downlink frequency resources in an XDD system according to an embodiment of the disclosure.

FIG. 10 is a view illustrating an example of self-interference between uplink and downlink frequency resources in an XDD system according to an embodiment of the disclosure.

Referring to FIG. 10, in the case of an XDD system, a downlink resource 1000 and an uplink resource 1001 are divided in the frequency domain and, in this case, a guard band (GB) 1004 may be present between the downlink resource 1000 and the uplink resource 1001. Actual downlink transmission may be performed in the downlink bandwidth 1002 in the downlink resource 1000, and actual uplink transmission may be performed in the uplink bandwidth 1003 in the uplink resource 1001. In this case, the uplink or downlink transmission band 1002 or 1003 may cause leakage 1010 to the outside. In the area where the downlink resource 1000 and the uplink resource 1001 are adjacent to each other (or they at least partially overlap each other), interference 1005 may occur due to the leakage 1010, and this may be referred to as adjacent carrier leakage (ACL) 1005. FIG. 10 illustrates an example in which ACL 1005 occurs from the downlink resource 1000 to the uplink resource 1001. As the downlink bandwidth 1002 and the uplink bandwidth 1003 become closer to each other, the influence of signal interference by the ACL 1005 may increase, so that the performance of uplink or downlink transmission may be deteriorated.

As an example, as shown, some resource area 1006 in the uplink band 1003 adjacent to the downlink band 1002 may be significantly influenced by the ACL 1005. Some resource area 1007 in the uplink band 1003 relatively far away from the uplink band 1002 may be less influenced by the interference by the ACL 1005. In other words, the uplink band 1003 may have a resource area 1006 which is relatively more influenced by the interference and a resource area 1007 which is relatively less influenced by the interference. A guard band 1004 may be inserted between the downlink bandwidth 1002 and the uplink bandwidth 1003 for the purpose of reducing performance deterioration.

As the size of the guard band 1004 increase, the influence by the interference due to the ACL 1005 between the downlink bandwidth 1002 and the uplink bandwidth 1003 may advantageously reduce. However, as the size of the guard band 1004 increases, the resources available for transmission/reception reduce, lowering resource efficiency. In contrast, as the size of the guard band 1004 reduces, the amount of resources available for transmission/reception may increase. Thus, resource efficiency may be increased, but the influence by the interference due to the ACL 1005 may increase between the downlink bandwidth 1002 and the uplink bandwidth 1003. Accordingly, it is critical to determine a proper size of the guard band 1004 considering the tradeoff.

A need may exist for a special type of transceiver structure for effectively processing self-interference between TX signal (or downlink/uplink signal) and RX signal (or uplink/downlink signal). For example, the transceiver structure shown in FIG. 9 may be considered. The transceiver structure shown in FIG. 9 may process the above-described self-interference in various methods.

As an embodiment, the DPD block 911 of the TX end may pre-distort the TX signal in the digital domain, thereby minimizing the power leakage (e.g., the ACL 1005 of FIG. 10) to the adjacent band. As another example, the SIC block 921 of the TX end may play a role to remove self-interference included in the RX signal. Other various transmission/reception techniques for efficient interference control may apply. In this case, parameters for the blocks in the transceiver should be able to be set to proper values to effectively process interference between the transceiver and receiver in the base station or the UE. In this case, the proper parameter values of the blocks for effectively processing interference may differ depending on the uplink and downlink transmission resource patterns. Thus, when the uplink and downlink transmission resource patterns vary, each device may require a predetermined delay time for changing the pattern.

In the disclosure, a resource configuration for uplink and downlink transmission/reception in the time and frequency domains is described, and embodiments for changing to different uplink and downlink configurations in a specific uplink and downlink configuration are provided.

Higher layer signaling below may include at least one or a combination of one or more of the following signaling.

- master information block (MIB)
- system information block (SIB) or SIB X (X=1, 2, . . . )
- radio resource control (RRC)
- medium access control (MAC) control element (CE)
- UE capability reporting
- UE assistance information message Further, L1 signaling may include at least one or a combination of one or more of the following physical layer channels or signaling methods.

- physical downlink control channel (PDCCH)
- downlink control information (DCI)
- UE-specific DCI
- group common DCI
- common DCI
- scheduling DCI (e.g., DCI used for scheduling downlink or uplink data)
- non-scheduling DCI (e.g., DCI not for the purpose of scheduling downlink or uplink data)
- physical uplink control channel (PUCCH)
- uplink control information (UCI)

Described here is signaling of cell-specific configuration information for uplink and/or downlink resource configuration in the time domain and frequency domain in the XDD system. The UE may be configured with different frequency domain resources for uplink and downlink in the same time domain resource through resource configuration for uplink or downlink described below. Accordingly, the resource where the UE is capable of uplink transmission or downlink reception may increase, and uplink coverage of the UE and base station may be enhanced. The resource configuration for uplink or downlink transmission/reception is referred to below as uplink-downlink configuration for convenience of description.

In the XDD system, the UE may be allocated resources for transmission/reception, separately for uplink and downlink in the frequency domain as well as time domain. Accordingly, the resources for uplink or downlink transmission/reception may be configured for both the time domain and the frequency domain, rather than configured only for the time domain like the TDD system. The base station may configure a guard band to the UE through resource configuration for uplink or downlink transmission/reception in the time domain and frequency domain, thereby suppressing influence by interference due to the out-of-band (OOB) emissions caused as the frequency bands of the uplink and downlink resources are relatively close to each other as compared with FDD. Further, the UE may determine what frequency band the UE is actually scheduled and transmitted/received in although the uplink BWP and the downlink BWP have the same center frequency through resource configuration for uplink or downlink transmission/reception in the time domain and frequency domain.

The following methods may be considered as the resource configuration for uplink or downlink transmission/reception in the time domain and frequency domain in the XDD system.

[Method 1]

To provide the resource configuration for uplink or downlink transmission/reception in the time domain and frequency domain to the UE, the base station may divide the entire frequency band into n frequency bands and transmit information indicating the uplink-downlink configuration (hereinafter, referred to as uplink-downlink configuration information) in the time domain to the UE in each frequency band. Each of the n frequency bands may be constituted of a set or group of contiguous resource blocks (RBs) and this may be referred to as a resource block set (RBS) or resource block group (RBG). For convenience of description, it is denoted as the RBS in the disclosure.

The uplink-downlink configuration information for each frequency band may include uplink-downlink pattern information and reference subcarrier spacing information. The uplink-downlink pattern information may include the periodicity to which the pattern is applied in the time domain, the number of contiguous downlink slots from the start point of the pattern, the number of symbols of the next slot, and the number of contiguous uplink slots from the end of the pattern and the number of symbols of the immediately prior slot. In this case, slots and symbols not indicated by uplink or downlink may be determined as flexible slots/symbols.

Figure 11:
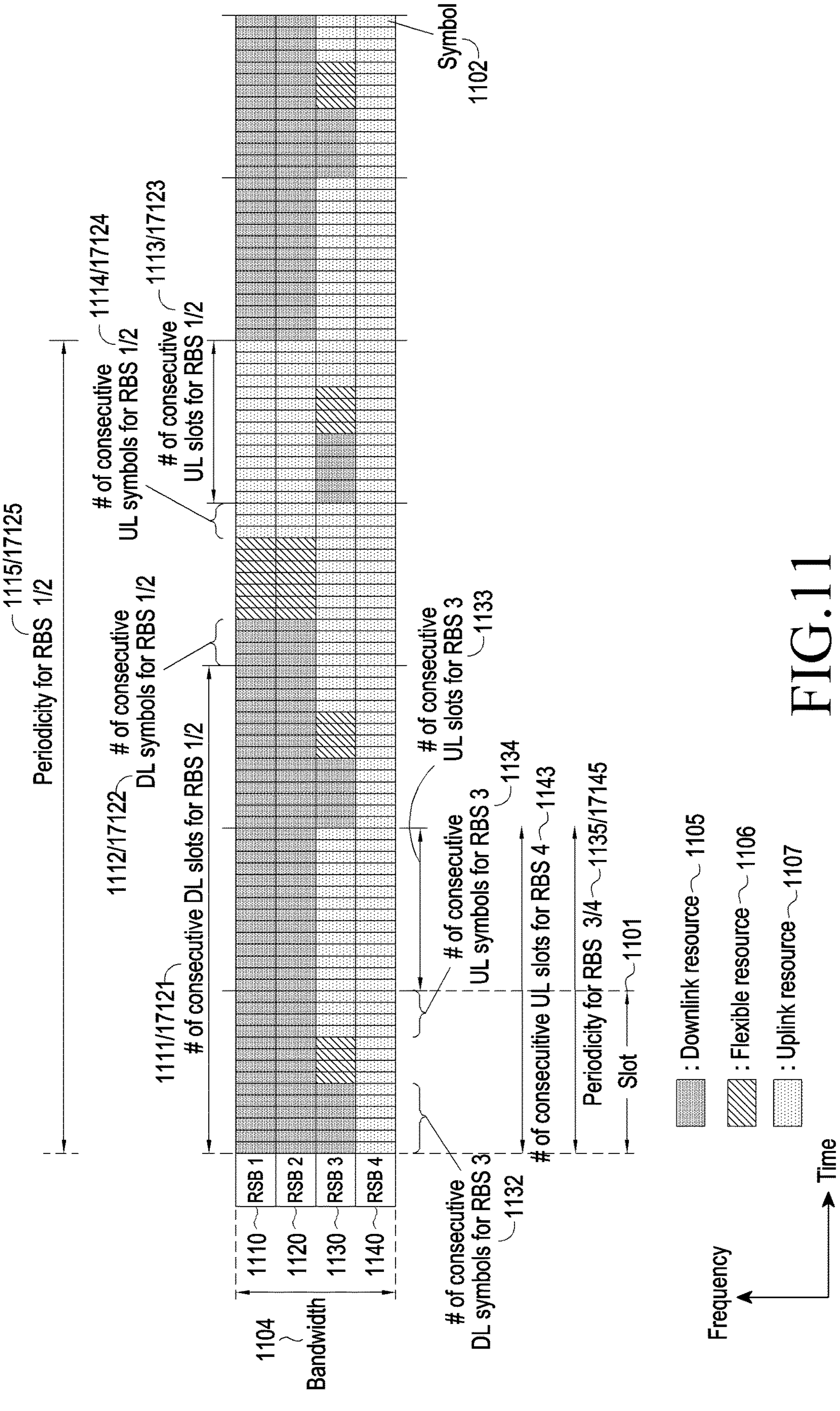
FIG. 11 is a view illustrating an example of uplink-downlink configurations in a time and frequency domain using a pattern in the time domain in an XDD system according to an embodiment of the disclosure.

FIG. 11 is a view illustrating an example of uplink-downlink configurations in a time and frequency domain using a pattern in the time domain in an XDD system according to an embodiment of the disclosure.

Referring to FIG. 11, the entire frequency band 1104 is divided into n=4 RBSs 1110, 1120, 1130, and 1140, and a pattern representing the uplink-downlink configuration in the time domain may be used for each RBS. In the illustrated example, each slot 1101 may include 14 symbols 1102, and the slot and symbol in each pattern according to the uplink-downlink configuration may be configured as a downlink resource 1105, an uplink resource 1107, or a flexible resource 1106.

As an example, the pattern period 1115 of RBS1 1110 may be set to five slots (or 5 ms for the subcarrier spacing of 15 kHz), the number 1111 of contiguous downlink slots from the start point of the pattern may be set to three, the number 1113 of downlink symbols of the next slot to four, the number 1113 of contiguous uplink slots from the end of the pattern to one, and the number 1114 of the uplink symbols of the immediately prior slot to three. The uplink-downlink configurations 1121, 1122, 1123, and 1124 of RBS2 1120 may be the same as those of RBS1 1110.

The uplink-downlink pattern period 1135 of RBS3 1130 may be set to two slots (or 2 ms for the subcarrier spacing of 15 kHz), the number of contiguous downlink slots from the start point of the pattern may be set to zero, the number 1132 of downlink symbols of the next slot to six, the number 1133 of contiguous uplink slots from the end of the pattern to one, and the number 1134 of the uplink symbols of the immediately prior slot to four. The uplink-downlink pattern period 1145 of RBS4 1140 may be set to two slots (or 2 ms for the subcarrier spacing of 15 kHz), the number of contiguous downlink slots from the start point of the pattern may be set to zero, the number of downlink symbols of the next slot to zero, the number 1133 of contiguous uplink slots from the end of the pattern to two, and the number 1134 of the uplink symbols of the immediately prior slot to zero.

Since uplink-downlink configurations are configured in each RBS in the limited overhead for uplink-downlink configuration, an uplink or downlink resource may be flexibly configured relatively in the time domain.

[Method 2]

For uplink-downlink configuration in the time domain and frequency domain to the UE, the base station may divide the entire frequency band into n frequency bands and transmit information indicating the uplink-downlink configuration (hereinafter, referred to as uplink-downlink configuration information) in the frequency domain to the UE in each frequency band. The uplink-downlink configuration information for each pattern may include uplink-downlink pattern information and reference subcarrier spacing information. The uplink-downlink pattern information may include the number of slot(s)/symbol(s) in the time domain having the same pattern, the number of contiguous downlink RBSs from the start point of the entire frequency band, the number of downlink RBs in the next RBS, the number of contiguous uplink RBSs from the end of the entire frequency band, and the number of uplink RBs of the prior RBS. In this case, the RBS and RB not indicated as uplink and downlink may be determined as flexible RBS/RB.

Figure 12:
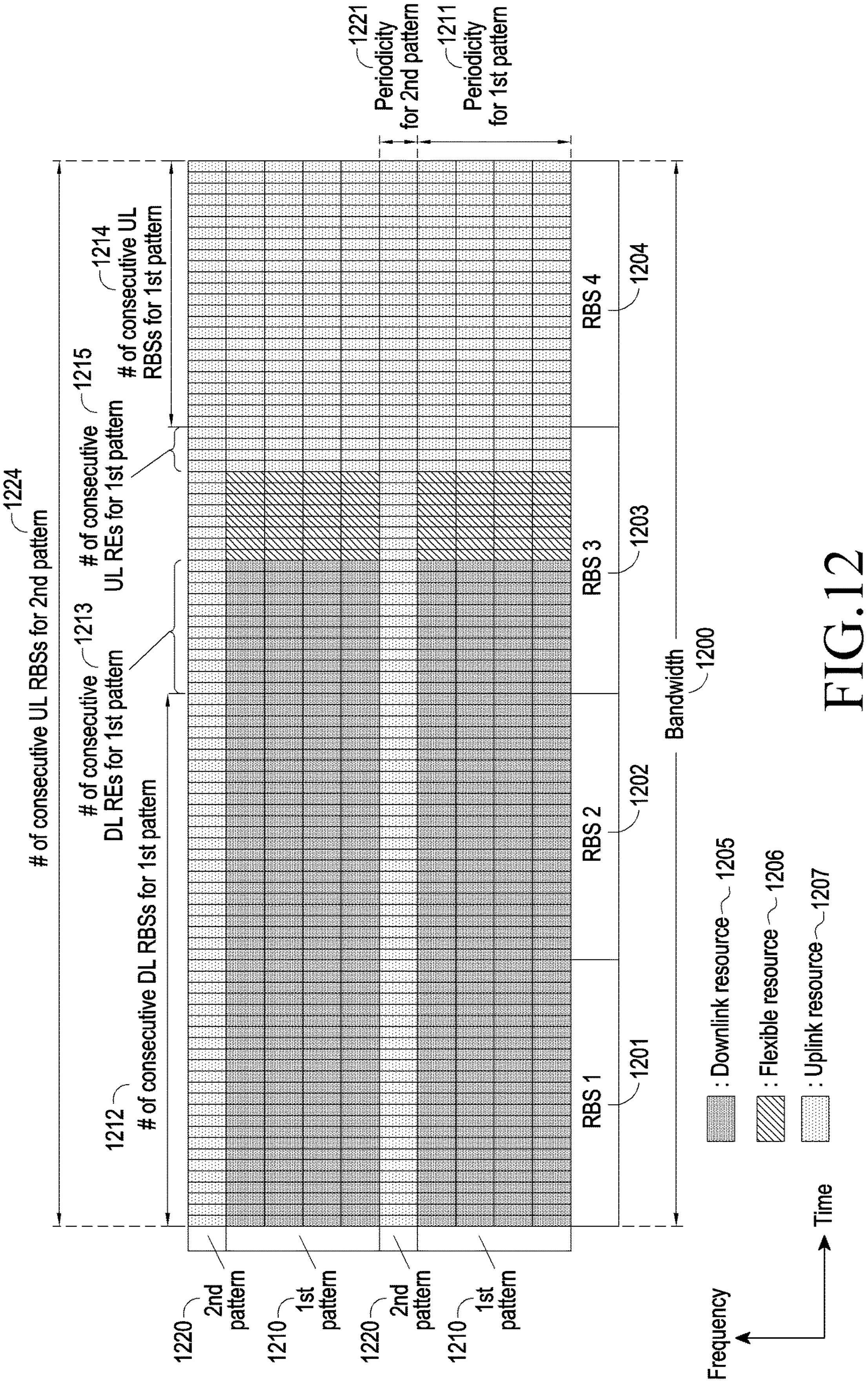
FIG. 12 is a view illustrating an example of uplink-downlink configurations in a time and frequency domain using a pattern in the frequency domain in an XDD system according to an embodiment of the disclosure.

FIG. 12 is a view illustrating an example of uplink-downlink configurations in a time and frequency domain using a pattern in the frequency domain in an XDD system according to an embodiment of the disclosure.

Referring to FIG. 12, the entire frequency band 1200 is divided into n=4 RBSs 1201, 1202, 1203, and 1204, and an uplink-downlink configuration may be used for each pattern in the frequency domain per RBS. Each RBS may include 24 RBs, and according to the uplink-downlink configuration, the RB in each pattern may be set as a downlink resource 1205, uplink resource 1207, or flexible resource 1206.

As an example, the period 1211 of the first pattern 1210 may be set to four slots (or 4 ms for the subcarrier spacing of 15 kHz), the number 1212 of contiguous downlink RBSs from the start point of the entire frequency band may be set to two, the number 1213 of downlink RBs of the next RBS to 12, the number 1214 of contiguous uplink RBSs from the end of the entire frequency band to one, and the number 1215 of the uplink RBs of the prior RBS to four. The period 1221 of the second pattern 1220 may be set to one slot (or Ims for the subcarrier spacing of 15 kHz), and the number 1224 of contiguous uplink RBSs from the end of the entire frequency band may be set to four.

When the first pattern 1210 and the second pattern 1220 are configured by the base station, the two patterns 1210 may be repeatedly applied with their respective periods 1211 and 1220 in the time domain.

Since the uplink-downlink resources are configured in the frequency domain with the time domain period for each pattern in the limited overhead for uplink-downlink configuration, uplink or downlink resources may be configured relatively more flexibly in the frequency domain than in the time domain. In this case, a guard band may be efficiently configured as a scheme for reducing interference with the uplink channel or signal reception by the out-of-band emission caused when the base station transmits a downlink channel or signal in the downlink resource in the XDD system.

The XDD system requires that the entire frequency resource be divided into specific units for application of the uplink-downlink configuration, rather than simply dividing uplink and downlink resources only in the time domain as in the TDD system. As an example, when the entire frequency band is 100 MHz, and the subcarrier spacing is 30 kHz, the entire frequency band may be constituted of 273 RBs. In this case, significant overhead is required to configure each of the 273 RBs as an uplink or downlink resource.

Thus, the XDD system may consider the following methods for dividing the frequency band to which the time domain and frequency domain uplink-downlink configurations are applied.

[Method 1]

The RBs of the entire frequency band may be constituted of n groups each including a specific number of RBs. The number of RBs per group may be indicated through the uplink-downlink configuration or be set to a value pre-agreed on between the base station and the UE. As an example, when the subcarrier spacing (SCS) is 30 kHz, and the entire frequency band is 100 MHz, the total number of RBs is 273. The number of RBs in each group may be included in the uplink-downlink configuration to be indicated, or be pre-agreed on between the base station and the UE. If the number of RBs in each group is set to 24, n= [total number of RBs/number of RBs configured per group]=[273/24]=12 groups in total may be configured. The number of RBs in each group may be efficiently determined to reduce the overhead for the uplink-downlink configuration of the frequency domain.

The setting of the number of RBs per group to configure the RBs of the frequency band into n groups of a specific number of RBs is not limited to the value indicated by signaling of the uplink-downlink configuration or pre-agreed on but may also be indicated through at least one of the system information block, UE-specific configuration information through dedicated higher layer signaling, media access control (MAC) control element (CE), or L1 signaling (i.e., downlink control information).

[Method 2]

The entire frequency band may be constituted of n groups with a specific frequency band. The frequency bandwidth of the specific frequency band belonging to each group may be indicated through the uplink-downlink configuration or determined to be a value pre-agreed on between the base station and the UE. As an example, if the frequency band per group in the entire frequency band of 100 MHz is indicated as 20 MHz by the uplink-downlink configuration or is set to 20 MHz according to a pre-configuration pre-agreed on between the base station and the UE, n=[total frequency bands/frequency bands configured per group]=[100/20]=5 groups in total may be configured. The frequency bandwidth in each group may be efficiently determined to reduce the overhead for the uplink-downlink configuration of the frequency domain.

The setting of the frequency bandwidth per group to configure the entire frequency band into n groups of a specific frequency bandwidth is not limited to the value indicated by signaling of the uplink-downlink configuration or pre-agreed on but may also be indicated through at least one of the pre-agreed system information block, UE-specific configuration information through dedicated higher layer signaling, MAC CE, or L1 signaling (e.g., downlink control information).

[Method 3]

The entire frequency band may be constituted of two groups divided by a guard band. The frequency band of the guard band may be indicated through the uplink-downlink configuration, and two groups respectively including a lower frequency band and a higher frequency band than the guard band may be configured around the guard band. As an example, if 50 carrier resource blocks (CRBs) are configured starting from the 100th CRB with respect to reference point A which means the frequency point as the guard band in the entire frequency band of 100 MHz, reference point A to the 99th CRB which are a frequency band lower than the guard band may become the first group, and the 150th CRB to the last CRB which are a higher frequency band than the guard band may become the second group.

The two groups may be efficiently determined to reduce the overhead for the uplink-downlink configuration of the frequency domain. It is very difficult to implement the base station so that the downlink resource and the uplink resource are non-contiguously allocated at the same time point, and interference due to the OOB may occur between the uplink and the downlink. Therefore, if the downlink or uplink should be configured contiguously all the time, the two groups may be efficiently divided by the guard band configured between the downlink and the uplink. The UE may receive the start position (e.g., CRB number) and size (e.g., number of CRBs) of the guard band from the base station through the uplink-downlink configuration and divide the entire frequency band into two groups with respect to the guard band.

The setting of the guard band to configure the entire frequency band into two groups is not limited to the value indicated by signaling of the uplink-downlink configuration but may also be indicated through at least one of a pre-agreed value, the system information block, UE-specific configuration information through dedicated higher layer signaling, MAC CE, or L1 signaling (e.g., downlink control information).

According to an embodiment of the disclosure, uplink and downlink resources may be flexibly configured in the time and frequency domains. Accordingly, one time and frequency resource may be configured as uplink or downlink. Hereinafter, in the disclosure, configuring each time and frequency resource as uplink or downlink is referred to as "uplink-downlink configuration (UL-DL configuration)". The uplink-downlink configuration may include any one of a downlink symbol, an uplink symbol, and a flexible symbol configuration. For example, one uplink-downlink configuration may correspond to one or more DL-UL patterns indicated by the uplink-downlink configuration information exemplified in FIG. 6. For example, one uplink-downlink configuration may correspond to one or more DL-UL patterns indicated by the uplink-downlink configuration information exemplified in FIG. 11 or FIG. 12.

According to an embodiment, the uplink-downlink configuration may be changed to static, semi-static, or dynamic. The base station may transmit or indicate the uplink-downlink configuration information through at least one of [combination of higher layer signaling or L1 signaling] or [combination of higher layer signaling and L1 signaling]. As an example, the base station may set the uplink-downlink configuration through higher layer signaling. For example, the base station may set one or more uplink-downlink configurations through higher layer signaling and activate one of the uplink-downlink configurations through higher layer signaling (e.g., RRC signaling or MAC CE) or L1 signaling. If the UE receives or is indicated for the uplink-downlink configuration from the base station, reception may be expected for the resource configured as downlink and transmission may be expected for the resource configured as uplink. Various signaling methods of uplink-downlink configuration are as described above.

According to an embodiment of the disclosure, the uplink-downlink configuration may be changed based on L1 signaling (e.g., DCI). The base station may transmit a DCI format including a change indicator to change uplink-downlink configuration A into uplink-downlink configuration B (where B differs from A) to the UE through the PDCCH. The UE may receive the DCI format including the change indicator to change the uplink-downlink configuration from the base station and change the current uplink-downlink configuration A into uplink-downlink configuration B based on the change indicator in the DCI format. After the change, uplink-downlink configuration B may be explicitly or implicitly indicated by the change indicator or be pre-agreed on between the base station and the UE.

According to an embodiment of the disclosure, a table constituted of a plurality of uplink-downlink configurations may be configured from the base station to the UE through higher layer signaling or pre-defined in the base station and the UE. For example, an "uplink-downlink configuration table" constituted of N uplink-downlink configurations {uplink-downlink configuration #1, uplink-downlink configuration #2, uplink-downlink configuration #3, . . . , uplink-downlink configuration #N} may be pre-defined or be transmitted from the base station to the UE through higher layer signaling. The base station may transmit the change indicator indicating uplink-downlink configuration #X to activate in the uplink-downlink configuration table to the UE through L1 signaling (e.g., DCI format). The UE may activate uplink-downlink configuration #X indicated by the change indicator in the L1 signaling (e.g., DCI format) received from the base station based on the uplink-downlink configuration table.

According to an embodiment of the disclosure, when the uplink-downlink configuration is changed, a change delay time $T_{delay}$ may be considered before using the changed uplink-downlink configuration. As described above, the parameters for the blocks in the transceiver to effectively process interference between downlink and uplink may be configured according to the uplink-downlink transmission resource pattern, so that a predetermined delay time $T_{delay}$ may be used to change the transceiver parameters according to the change in uplink-downlink configuration.

Figure 13:
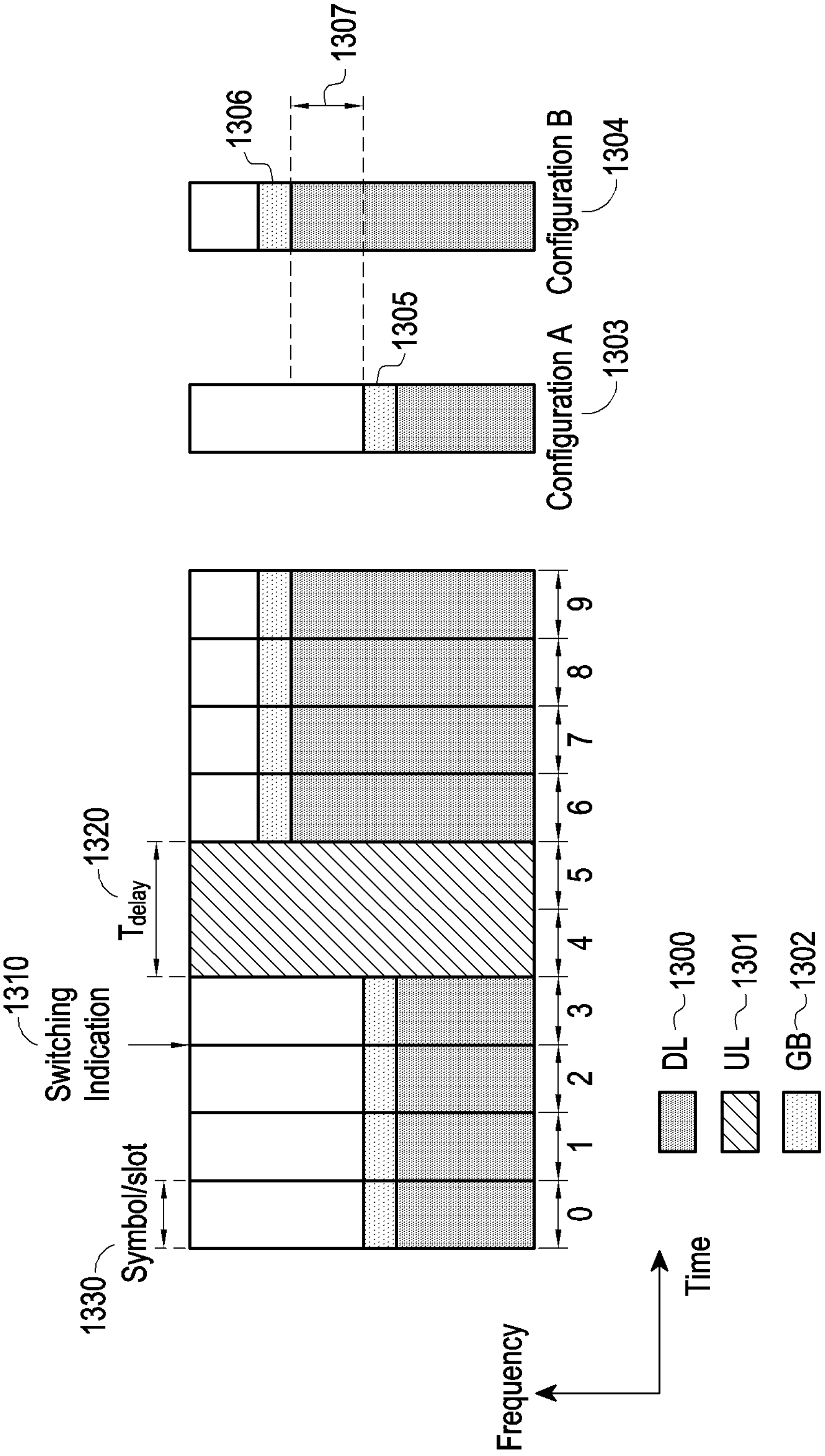
FIG. 13 is a view illustrating an example of an uplink-downlink configuration change according to an embodiment of the disclosure.

FIG. 13 is a view illustrating an example of an uplink-downlink configuration change according to an embodiment of the disclosure.

FIG. 13 illustrates an example in which a configuration change occurs between uplink-downlink configuration A 1303 and uplink-downlink configuration B 1304. As an example, uplink-downlink configurations A and B may be selected from the uplink-downlink configuration table shared between the base station and the UE. The resource unit in the time domain may be the symbol or slot or other various time units and, in the illustrated example, the slot unit is assumed. In the illustrated example, the base station may transmit an uplink-downlink configuration change indicator 1310 to the UE, and the change indicator 1310 may indicate to change uplink-downlink configuration A 1303 into uplink-downlink configuration B 1304. As an example, the change indicator 1310 may include information to explicitly or implicitly indicate uplink-downlink configuration B 1304 to change. As an example, uplink-downlink configuration B 1304 to change may be pre-agreed on between the base station and the UE, and the change indicator 1310 may include information for triggering the uplink-downlink configuration change.

To change uplink-downlink configuration A 1303 into uplink-downlink configuration B 1304, a change delay time corresponding to $T_{delay}$ 1320 may be required in the base station and the UE. In other words, the base station may transmit the change indicator 1310 in slot n to change the uplink-downlink configuration and perform uplink and downlink operations based on the changed uplink-downlink configuration from slots after slot n+$T_{delay}$. Likewise, upon receiving the change indicator in slot n from the base station, the UE may perform uplink and downlink operations based on the changed uplink-downlink configuration from slots after slot n+$T_{delay}$.

In the illustrated example, the change indicator 1310 to indicate to change into uplink-downlink configuration B 1304 in slot 3 may be transmitted. In an embodiment, $T_{delay}$ 1320 may be pre-agreed on as a specific value, e.g., "2," between the base station and the UE. The base station may start transmission/reception operations according to uplink-downlink configuration B 1304 in slot 6, which is two slots after slot 3. Likewise, upon receiving the change indicator 1310 in slot 3, the UE expects transmission/reception operations according to uplink-downlink configuration B 1304 from slot 6.

According to an embodiment of the disclosure, the change delay time $T_{delay}$ 1320 may be conditionally applied when the "change delay condition" pre-agreed on between the base station and the UE is met. In an embodiment, when the change delay condition is met, the base station and the UE may regard $T_{delay}$ 1320 as a value larger than 0, as pre-agreed on, and when the change delay condition is not met, the base station and the UE may regard $T_{delay}$ 1320 as 0. The change delay condition may include at least one of, e.g., the following conditions or a combination of at least one or more conditions.

[Condition 1]

When the uplink-downlink direction in a specific frequency domain resource is changed by uplink-downlink configuration A before change and uplink-downlink configuration B after change, a change delay time $T_{delay}$ larger than 0 may be required. For example, in the example of FIG. 13, for the same frequency domain resource 1307, uplink-downlink configuration A 1303 before change indicates uplink, but uplink-downlink configuration B 1304 may indicate downlink. As such, when a direction change occurs between uplink and downlink in the same frequency domain resource, a change delay time $T_{delay}$ 1320 may be required. In other words, since the uplink-downlink interference state may be rendered to differ from before due to a change in uplink-downlink configuration in the same frequency domain resource, the base station or UE needs an additional time to set the parameters of the transceiver to new values, and a change delay time $T_{delay}$ for ensuring the additional time may be required.

[Condition 2]

When the guard band is varied in uplink-downlink configuration A before change and uplink-downlink configuration B after change (e.g., when the guard band is changed in position or size), a change delay time $T_{delay}$ larger than 0 may be required. For example, in the example of FIG. 13, uplink-downlink configuration A 1303 before change includes a guard band 1305, and uplink-downlink configuration B 1304 after change includes a guard band 1306. The guard bands 1305 and 1306 are preset in different positions. When the guard band is so changed, a change delay time $T_{delay}$ 1320 may be required.

The guard band in each uplink-downlink configuration has a size and position required considering interference between uplink and downlink. In other words, the configuration for the guard band may also differ depending on the uplink-downlink configuration, and a change in guard band may mean a change in the interference context between uplink and downlink. Accordingly, if the guard band is changed by the change in uplink-downlink configuration, the uplink-downlink interference state may be rendered to differ from before. Thus, the base station or UE requires an additional time to set the parameters of the transceiver to the optimal values and may determine that a change delay time $T_{delay}$ to ensure the additional time is required.

[Condition 3]

When uplink-downlink configuration A before change corresponds to a specific uplink-downlink configuration X, a change delay time $T_{delay}$ 1320 larger than 0 may be required. In an embodiment, the specific uplink-downlink configuration X may be pre-defined, explicitly preset to the UE by the base station through higher layer signaling, or implicitly determined by the system parameter. In an embodiment, one or more specific uplink-downlink configurations X may be defined. In an embodiment, an uplink-downlink configuration set X including a plurality of specific uplink-downlink configurations may be configured. When uplink-downlink configuration A before change is included in the uplink-downlink configuration set X, the base station and the UE may determine that a change delay time is required.

[Condition 4]

When uplink-downlink configuration B after change corresponds to a specific uplink-downlink configuration Y, a change delay time $T_{delay}$ 1320 larger than 0 may be required. In an embodiment, the specific uplink-downlink configuration Y may be pre-defined, explicitly preset to the UE by the base station through higher layer signaling, or implicitly determined by the system parameter. In an embodiment, one or more specific uplink-downlink configurations Y may be defined. In an embodiment, an uplink-downlink configuration set Y including a plurality of specific uplink-downlink configurations may be configured. When uplink-downlink configuration B after change is included in the uplink-downlink configuration set Y, the base station and the UE may determine that a change delay time is required.

[Condition 5]

When uplink-downlink configuration A before change corresponds to the specific uplink-downlink configuration X, and uplink-downlink configuration B after change corresponds to the specific uplink-downlink configuration Y, a change delay time $T_{delay}$ 1320 may be required. In an embodiment, the specific uplink-downlink configuration X and the specific uplink-downlink configuration Y may be pre-defined, explicitly preset to the UE by the base station through higher layer signaling, or implicitly determined by the system parameter. In an embodiment, there may be one or more specific uplink-downlink configurations X and one or more specific uplink-downlink configurations Y. In an embodiment, an uplink-downlink configuration set X including a plurality of uplink-downlink configurations and an uplink-downlink configuration set Y including a plurality of uplink-downlink configurations may be configured. When uplink-downlink configuration A before change is included in the uplink-downlink configuration set X, and uplink-downlink configuration B after change is included in the uplink-downlink configuration set Y, the base station and the UE may determine that a change delay time is required.

According to an embodiment of the disclosure, the uplink-downlink change delay time $T_{delay}$ 1320 may always be used when a change in uplink-downlink configuration occurs. In other words, the base station and the UE may delay the change in uplink-downlink configuration always based on the change delay time $T_{delay}$ regardless of the above-described change delay conditions.

According to an embodiment of the disclosure, the uplink-downlink change delay time $T_{delay}$ may be predefined as a fixed value larger than 0. The base station and the UE may delay the change in uplink-downlink configuration based on the pre-defined $T_{delay}$ value.

According to an embodiment of the disclosure, the uplink-downlink change delay time $T_{delay}$ may be explicitly set or notified through at least one higher layer signaling from the base station to the UE. The base station may delay the change in uplink-downlink configuration based on the set $T_{delay}$ value, and the UE may delay the change in uplink-downlink configuration based on the set $T_{delay}$ value notified of by the base station.

According to an embodiment of the disclosure, the uplink-downlink change delay time $T_{delay}$ may be notified of from the UE to the base station through UE capability signaling. The base station and the UE may delay the change in uplink-downlink configuration based on the $T_{delay}$ value notified of through UE capability signaling.

According to an embodiment of the disclosure, the uplink-downlink change delay time $T_{delay}$ may be defined to differ depending on the subcarrier spacing value. In other words, for the subcarrier spacing i, $T_{delay,\ i}$ may be defined. For example, when the subcarrier spacing is 15 kHz, $T_{delay,\ 0}$ may be used. When the subcarrier spacing is 30 kHz, $T_{delay,1}$ may be used. When the subcarrier spacing is 60 kHz, $T_{delay,2}$ may be used. When the subcarrier spacing is 120 kHz, $T_{delay,3}$ may be used. The change delay time for each subcarrier spacing may be predetermined as a fixed value or be notified of by signaling between the base station and the UE.

According to an embodiment of the disclosure, the uplink-downlink change delay time $T_{delay}$ may be defined to be the same regardless of the subcarrier spacing value.

According to an embodiment of the disclosure, the uplink-downlink change delay time $T_{delay}$ may be defined to differ depending on the uplink-downlink configurations before and/or after change. For example, upon changing from uplink-downlink configuration A1 to uplink-downlink configuration B1, the change delay time $T_{delay,1}$ may be used. For example, upon changing from uplink-downlink configuration A2 to uplink-downlink configuration B2, the change delay time $T_{delay,2}$ may be used.

According to an embodiment of the disclosure, the base station may refrain from transmission or reception for the UE during a predetermined change delay time $T_{delay}$ after the uplink-downlink configuration is changed. For example, the base station may delay transmission/reception of the PDCCH/PDSCH/PUCCH/PUSCH for the UE, at least, during the change delay time. For example, the base station may not schedule transmission or reception of a channel related to the UE during the change delay time. The UE may not expect transmission or reception during the uplink-downlink change delay time $T_{delay}$. When the UE receives the change indicator for the uplink-downlink configuration in slot n, and an uplink-downlink change delay time is required, the UE may not expect transmission or reception from slot n until slot n+$T_{delay}$.

According to an embodiment of the disclosure, the uplink-downlink configuration change indicator may be transmitted from the base station to the UE through at least one of the common DCI (or DCI format monitored in the common search space), the group-common DCI (or DCI format monitored in type-3 common search space), the UE-specific DCI (or DCI format monitored in the UE-specific search space) or a DCI format including scheduling or a DCI format not including scheduling.

According to an embodiment of the disclosure, the uplink-downlink configuration change indicator may include uplink-downlink configuration information about one or more slots. In other words, the base station may transmit a change indicator indicating a new uplink-downlink configuration for one or more slots to the UE, and the UE may receive the change indicator and apply the new uplink-downlink configuration to the one or more slots. The UE may identify the one or more slots to which the new uplink-downlink configuration is applied according to the signaling from the base station or a pre-agreed rule.

Figure 14:
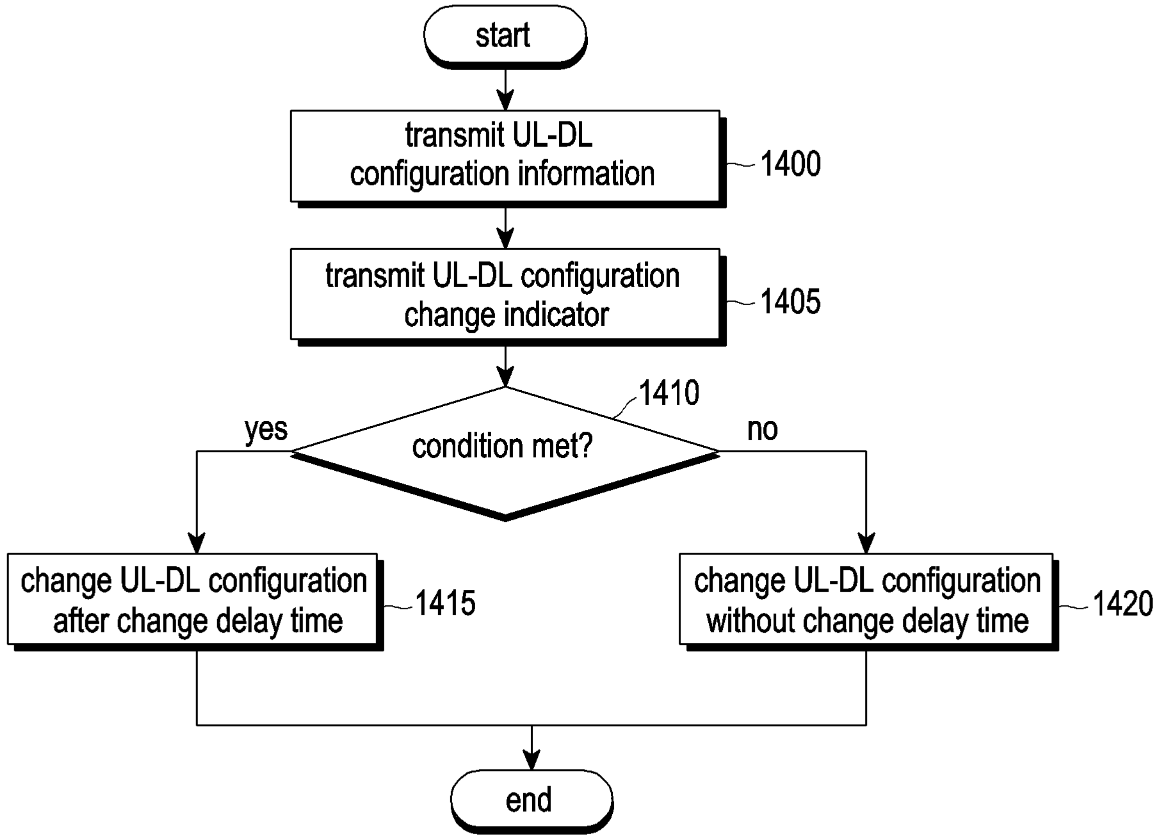
FIG. 14 is a flowchart illustrating an operational procedure of a base station according to an embodiment of the disclosure.

FIG. 14 is a view illustrating an operational procedure of a base station according to an embodiment of the disclosure.

Referring to FIG. 14, in step 1400, the base station may transmit uplink-downlink configuration information to the UE and perform transmission or reception operations according to the uplink-downlink configuration indicated by the uplink-downlink configuration information. In step 1405, the base station may transmit an uplink-downlink configuration change indicator to the UE. In step 1410, the base station may determine whether the above-described change delay conditions are met for the UE. In an embodiment, the determination of step 1410 may be performed based on the existing uplink-downlink configuration indicated by the uplink-downlink configuration information and the new uplink-downlink configuration indicated by the change indicator transmitted in step 1405.

If the change delay condition is determined to be met, in step 1415, the base station may apply the new uplink-downlink configuration according to the change indicator considering a pre-agreed change delay time. In an embodiment, the base station may schedule not to perform transmission or reception for the UE during the change delay time after the change indicator is transmitted. After the delay for the change delay time, the base station may perform transmission or reception for the UE according to the new uplink-downlink configuration.

If the change delay condition is determined not to be met, in step 1420, the base station may immediately apply the new uplink-downlink configuration after transmission of the change indicator without the change delay time. In an embodiment, the base station may start transmission/reception according to the new uplink-downlink configuration in the next slot after the slot when the change indicator is transmitted.

Figure 15:
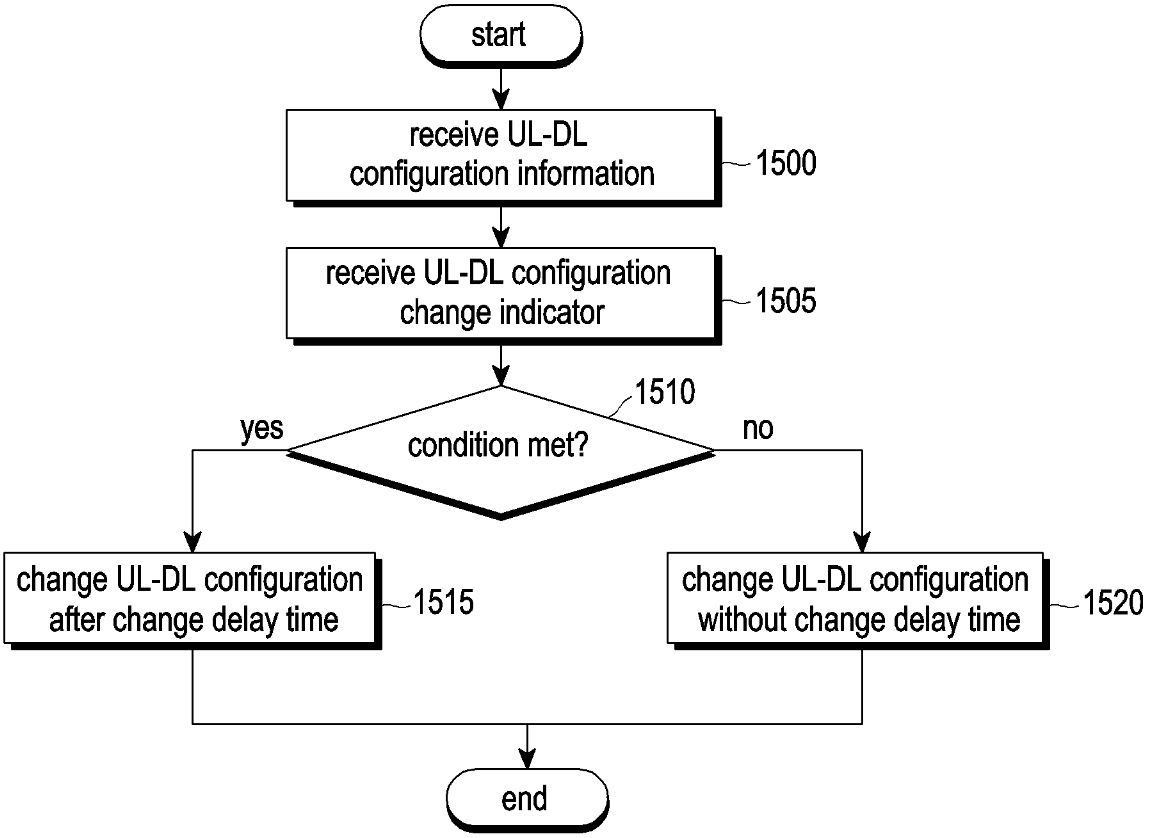
FIG. 15 is a flowchart illustrating an operational procedure of a UE according to an embodiment of the disclosure.

FIG. 15 is a view illustrating an operational procedure of a UE according to an embodiment of the disclosure.

Referring to FIG. 15, in step 1500, the UE may receive uplink-downlink configuration information from the base station and perform transmission or reception operations according to the uplink-downlink configuration information. In step 1505, the UE may transmit an uplink-downlink configuration change indicator from the base station. In step 1510, the UE may determine whether the above-described change delay conditions are met. In an embodiment, the determination of step 1510 may be performed based on the existing uplink-downlink configuration indicated by the uplink-downlink configuration information and the new uplink-downlink configuration indicated by the change indicator received in step 1505.

If the change delay condition is determined to be met, in step 1515, the UE may apply the new uplink-downlink configuration according to the change indicator considering a pre-agreed change delay time. In an embodiment, the UE may not expect transmission or reception during the change delay time after the change indicator is transmitted. If the change delay condition is determined not to be met, in step 1520, the UE may immediately apply the new uplink-downlink configuration after transmission of the change indicator without the change delay time. In an embodiment, the UE may expect transmission/reception according to the new uplink-downlink configuration in the next slot after the slot when the change indicator is received.

Figure 16:
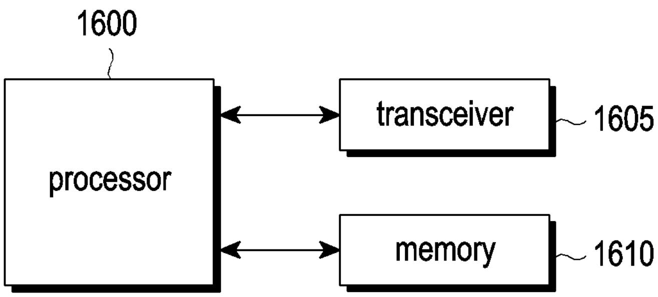
FIG. 16 is a block diagram illustrating an inner structure of a user equipment (UE) according to an embodiment of the disclosure.

FIG. 16 is a block diagram illustrating a structure of a UE according to an embodiment of the disclosure.

Referring to FIG. 16, the UE may include a transceiver 1605, a memory 1610, and a processor 1600. The configuration of the UE is not limited to the illustrated example. For example, the UE may include more components than those shown or omit some components. Further, at least some or all of the transceiver 1605, the memory 1610, and the processor 1600 may be implemented in the form of a single chip.

The transceiver 1605 may transmit and receive signals to/from a base station. The signals may include control information and data. To that end, the transceiver 1605 may include an RF transmitter for frequency-up converting and amplifying signals transmitted and an RF receiver for low-noise amplifying signals received and frequency-down converting the frequency of the received signals. The transceiver 1605 may receive signals via a radio channel, provide the signals to the processor 1600, and transmit signals transferred from the processor 1600 via a radio channel. As an example, the transceiver 1605 may have the above-described configuration of FIG. 9.

The memory 1610 may store programs and data necessary for the operation of the UE. The memory 1610 may store control information or data that is included in the signal transmitted/received by the UE. The memory 1610 may include a storage medium, such as ROM, RAM, hard disk, CD-ROM, or DVD, or a combination of storage media. Further, the memory 1610 may include a plurality of memories. The memory 1610 may store a program for executing an operation for changing the uplink-downlink configuration of the UE.

The processor 1600 may control a series of processes for the UE to be able to operate according to at least one of the above-described embodiments. The processor 1600 may execute the program stored in the memory 1610 to control the transceiver 1605 to receive at least one of uplink-downlink configuration information, an uplink-downlink change indicator, or a set value of a change delay time from the base station and perform transmission and reception operations according to an uplink-downlink configuration determined based on the received information.

Figure 17:
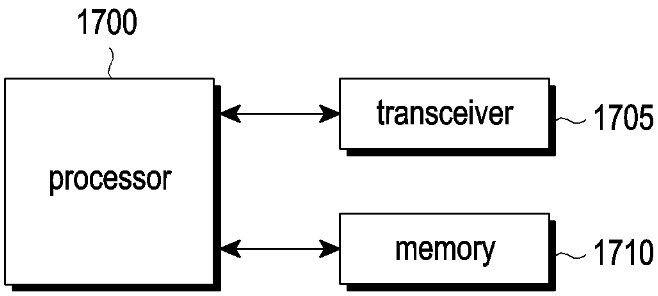
FIG. 17 is a block diagram illustrating an internal structure of a base station according to an embodiment of the disclosure.

FIG. 17 is a block diagram illustrating a structure of a base station according to an embodiment of the disclosure.

Referring to FIG. 17, the base station may include a transceiver 1705, a memory 1710, and a processor 1700. The configuration of the base station is not limited to the illustrated example. For example, the UE may include more components than those shown or omit some components. Further, at least some or all of the transceiver 1705, the memory 1710, and the processor 1700 may be implemented in the form of a single chip.

The transceiver 1705 may transmit and receive signals to/from a UE. The signals may include control information and data. To that end, the transceiver 1705 may include an RF transmitter for frequency-up converting and amplifying signals transmitted and an RF receiver for low-noise amplifying signals received and frequency-down converting the frequency of the received signals. The transceiver 1705 may receive signals via a radio channel, provide the signals to the processor 1700, and transmit signals transferred from the processor 1700 via a radio channel. As an example, the transceiver 1705 may have the above-described configuration of FIG. 9.

The memory 1710 may store programs and data necessary for the operation of the base station. Further, the memory 1710 may store control information or data that is included in the signal transmitted/received by the base station. The memory 1710 may include a storage medium, such as ROM, RAM, hard disk, CD-ROM, or DVD, or a combination of storage media. Further, the memory 1710 may include a plurality of memories. The memory 1710 may store a program for executing an operation for changing the uplink-downlink configuration of the base station.

The processor 1700 may control a series of processes for the base station to be able to operate according to at least one of the above-described embodiments. The processor 1700 may execute the program stored in the memory 1710 to control the transceiver 1705 to transmit at least one of uplink-downlink configuration information, an uplink-downlink change indicator, or a set value of a change delay time to the UE and perform transmission and reception operations according to an uplink-downlink configuration of the UE, determined based on the information.

The methods according to the embodiments descried in the specification or claims of the disclosure may be implemented in hardware, software, or a combination of hardware and software.

When implemented in software, there may be provided a computer readable storage medium or computer program product storing one or more programs (software modules). One or more programs stored in the computer readable storage medium or computer program product are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

The embodiments herein are provided merely for better understanding of the present invention, and the present invention should not be limited thereto or thereby. In other words, it is apparent to one of ordinary skill in the art that various changes may be made thereto without departing from the scope of the present invention. Further, the embodiments may be practiced in combination. For example, the base station and the UE may be operated in a combination of parts of an embodiment and another embodiment. Embodiments of the disclosure may be applied to other communication systems, and various modifications may be made thereto based on the technical spirit of embodiments. For example, embodiments may also be applied to LTE systems, 5G or NR systems.

The invention claimed is:

1. A method by a base station configured to change an uplink-downlink configuration in a wireless communication system, the method comprising:

transmitting uplink-downlink configuration information indicating a first uplink-downlink configuration to a user equipment (UE);

transmitting a change indicator indicating a second uplink-downlink configuration to the UE;

determining whether an uplink-downlink direction is changed in a specific frequency domain resource based on a change from the first uplink-downlink configuration to the second uplink-downlink configuration;

based on determining that the uplink-downlink direction is changed, waiting to communicate with the UE on the frequency domain resource according to the second uplink-downlink configuration until after a change delay time predetermined from transmission of the change indicator; and based on determining that the uplink-downlink direction is not changed, communicating with the UE according to the second uplink-downlink configuration without applying the change delay time after transmission of the change indicator.

2. The method of claim 1, further comprising:

based on a position and/or size of a guard band between a downlink resource and an uplink resource related to the UE being changed due to the change from the first uplink-downlink configuration to the second uplink-downlink configuration, determining to delay application of the second uplink-downlink configuration by the change delay time.

3. The method of claim 1, further comprising:

based on the first uplink-downlink configuration being included in a predetermined first uplink-downlink configuration set or the second uplink-downlink configuration being included in a predetermined second uplink-downlink configuration set, determining to delay application of the second uplink-downlink configuration by the change delay time.

4. The method of claim 1, further comprising:

determining not to schedule transmission or reception related to the UE during the change delay time.

5. A method by a user equipment (UE) configured to change an uplink-downlink configuration in a wireless communication system, the method comprising:

receiving uplink-downlink configuration information indicating a first uplink-downlink configuration from a base station;

receiving a change indicator indicating a second uplink-downlink configuration from the base station;

determining whether an uplink-downlink direction is changed in a specific frequency domain resource based on a change from the first uplink-downlink configuration to the second uplink-downlink configuration;

based on determining that the uplink-downlink direction is changed, waiting to communicate with the base station on the frequency domain resource according to the second uplink-downlink configuration until after a change delay time predetermined from transmission of the change indicator; and based on determining that the uplink-downlink direction is not changed, communicating with the base station according to the second uplink-downlink configuration without applying the change delay time after transmission of the change indicator.

6. The method of claim 5, further comprising:

based on a position and/or size of a guard band between a downlink resource and an uplink resource related to the UE being changed due to the change from the first uplink-downlink configuration to the second uplink-downlink configuration, determining to delay application of the second uplink-downlink configuration by the change delay time.

7. The method of claim 5, further comprising:

based on the first uplink-downlink configuration being included in a predetermined first uplink-downlink configuration set or the second uplink-downlink configuration being included in a predetermined second uplink-downlink configuration set, determining to delay application of the second uplink-downlink configuration by the change delay time.

8. The method of claim 5, further comprising:

determining not to schedule transmission or reception related to the base station during the change delay time.

9. A device of a base station configured to change an uplink-downlink configuration in a wireless communication system, the device comprising:

a transceiver configured to:

transmit uplink-downlink configuration information indicating a first uplink-downlink configuration to a user equipment (UE), and transmit a change indicator indicating a second uplink-downlink configuration to the UE; and a processor configured to:

determine whether an uplink-downlink direction is changed in a specific frequency domain resource based on a change from the first uplink-downlink configuration to the second uplink-downlink configuration, based on determining that the uplink-downlink direction is changed, control the transceiver to wait to communicate with the UE according to the second uplink-downlink configuration until after a change delay time predetermined from transmission of the change indicator, and based on determining that the uplink-downlink direction is not changed, communicate with the UE according to the second uplink-downlink configuration without applying the change delay time after transmission of the change indicator.

10. The device of claim 9, wherein the processor is further configured to, based on a position and/or size of a guard band between a downlink resource and an uplink resource related to the UE being changed due to the change from the first uplink-downlink configuration to the second uplink-downlink configuration, determine to delay application of the second uplink-downlink configuration by the change delay time.

11. The device of claim 9, wherein the processor is further configured to, based on the first uplink-downlink configuration being included in a predetermined first uplink-downlink configuration set or the second uplink-downlink configuration being included in a predetermined second uplink-downlink configuration set, determine to delay application of the second uplink-downlink configuration by the change delay time.

12. A device of a user equipment (UE) configured to change an uplink-downlink configuration in a wireless communication system, the device comprising:

a transceiver configured to:

receive uplink-downlink configuration information indicating a first uplink-downlink configuration from a base station, and receive a change indicator indicating a second uplink-downlink configuration to the base station; and a processor configured to:

determine whether an uplink-downlink direction is changed in a specific frequency domain resource based on a change from the first uplink-downlink configuration to the second uplink-downlink configuration, based on determining that the uplink-downlink direction is changed, control the transceiver to wait to communicate with the base station according to the second uplink-downlink configuration until after a change delay time predetermined from transmission of the change indicator, and based on determining that the uplink-downlink direction is not changed, communicate with the base station according to the second uplink-downlink configuration without applying the change delay time after transmission of the change indicator.

13. The device of claim 12, wherein the processor is further configured to, based on the first uplink-downlink configuration being included in a predetermined first uplink-downlink configuration set or the second uplink-downlink configuration being included in a predetermined second uplink-downlink configuration set, determine to delay application of the second uplink-downlink configuration by the change delay time.

14. The device of claim 9, wherein the processor is further configured to determine not to schedule transmission or reception related to the UE during the change delay time.

15. The device of claim 12, wherein the processor is further configured to, based on a position and/or size of a guard band between a downlink resource and an uplink resource related to the UE being changed due to the change from the first uplink-downlink configuration to the second uplink-downlink configuration, determine to delay application of the second uplink-downlink configuration by the change delay time.

16. The device of claim 12, wherein the processor is further configured to determine not to schedule transmission or reception related to the base station during the change delay time.

* * * * *